United States Patent
Sato et al.

(10) Patent No.: US 8,097,825 B2
(45) Date of Patent: Jan. 17, 2012

(54) LASER CLADDING APPARATUS AND METHOD

(75) Inventors: Akio Sato, Toyota (JP); Yoshinori Ishikawa, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 931 days.

(21) Appl. No.: 10/562,574

(22) PCT Filed: Jun. 29, 2004

(86) PCT No.: PCT/JP2004/009525
§ 371 (c)(1),
(2), (4) Date: Dec. 27, 2005

(87) PCT Pub. No.: WO2005/000517
PCT Pub. Date: Jan. 6, 2005

(65) Prior Publication Data
US 2006/0169679 A1    Aug. 3, 2006

(30) Foreign Application Priority Data
Jun. 30, 2003  (JP) .................................. 2003-187222

(51) Int. Cl.
*B23K 26/00*    (2006.01)

(52) U.S. Cl. ................ 219/64; 219/63; 219/65; 219/66; 219/84

(58) Field of Classification Search .................. 219/615, 219/121.47, 121.63–121.66, 121.84–121.85, 219/121.6, 121.75, 121.76; 427/554, 596
See application file for complete search history.

(56) References Cited

U.S. PATENT DOCUMENTS
4,059,876 A * 11/1977 Ditto .......................... 29/888.44
(Continued)

FOREIGN PATENT DOCUMENTS
DE        19909390 C1 * 11/2000
(Continued)

OTHER PUBLICATIONS
Supplementary European Search Report dated Nov. 19, 2007.
(Continued)

*Primary Examiner* — Henry Yuen
*Assistant Examiner* — Hung D Nguyen
(74) *Attorney, Agent, or Firm* — Finnegan, Henderson, Farabow, Garrett & Dunner, LLP

(57) ABSTRACT

A laser-clad processing apparatus of the present invention is one which is for carrying out laser-clad processing onto a valve-seat portion of a cylinder head, and is characterized in that it comprises cylinder-head holding means (1) for holding a cylinder head (H) in an inclining manner so that the central axial line of a valve seat becomes the vertical direction, a laser-processing head (2) for irradiating a laser beam onto a process part of the valve seat and at the same time discharging a powdery material to this process part, rotary means (3) which rotates around the central axial line of the valve seat in such a state that the laser-processing head is inclined with respect to the vertical direction, and powdery-material supply means (4) for supplying the powdery material to the laser-processing head.

Moreover, a laser-clad processing method of the present invention is characterized in that it fixes the cylinder head (H), and forms a clad layer while rotating the laser-processing head (2), which emits the laser beam with respect to the valve-seat portion of the cylinder head and discharges the powdery material, around the axial center line of the valve seat.

12 Claims, 17 Drawing Sheets

U.S. PATENT DOCUMENTS

| | | | |
|---|---|---|---|
| 5,571,430 A * | 11/1996 | Kawasaki et al. | 219/121.78 |
| 5,837,960 A * | 11/1998 | Lewis et al. | 219/121.63 |
| 6,056,827 A * | 5/2000 | Fukui et al. | 219/121.68 |
| 6,717,106 B2 * | 4/2004 | Nagano et al. | 219/121.83 |
| 6,838,638 B2 * | 1/2005 | Satou et al. | 219/121.73 |
| 2002/0003132 A1 * | 1/2002 | Scalzotto | 219/121.78 |
| 2002/0157249 A1 * | 10/2002 | Kim et al. | 29/888.44 |

FOREIGN PATENT DOCUMENTS

| | | |
|---|---|---|
| JP | 05311385 | 11/1993 |
| JP | 405311385 A * | 11/1993 |
| JP | 07-299575 | 11/1995 |
| JP | 08-224682 | 9/1996 |
| JP | 09-155583 | 6/1997 |
| JP | 10-501463 | 2/1998 |
| JP | 10286687 A * | 10/1998 |
| JP | 2891378 * | 5/1999 |
| JP | 2002-148491 | 5/2002 |
| JP | 2002-361453 | 12/2002 |
| JP | 2003-340583 | 12/2003 |
| WO | WO 95/20458 | 8/1995 |
| WO | WO 03/042508 A1 | 5/2003 |

OTHER PUBLICATIONS

International Search Report.

* cited by examiner

LASER CLADDING APPARATUS AND METHOD

TECHNICAL FIELD

The present invention relates to a laser-clad processing apparatus for forming a clad layer on a valve-seat portion of a cylinder head by means of a laser beam and a laser-clad processing method therefor, more particularly, it relates to a laser-clad processing apparatus which fixes a cylinder head and forms a clad layer while rotating a laser-processing head, which emits a laser beam with respect to a valve-seat portion of the cylinder head and discharges a powder material, around the axial center line of the valve seat, and a laser-clad processing method therefor.

BACKGROUND ART

As for a conventional technique in regard to laser-clad processing, a laser-clad apparatus disclosed in Japanese Unexamined Patent Publication (KOKAI) No. 9-155,583 has been known, for example. The laser-clad apparatus disclosed in the publication is, as shown in FIG. 25, one which is equipped with laser-beam irradiation means 50 for irradiating a laser beam L with respect to a process part W, a table T' for holding a cylinder head, rotary driving means 51 for rotating the cylinder head held on this table T' around the central axial line J of respective valve seats, and a table-position adjusting mechanism 52 for moving and adjusting the position of the table T' so as to coincide the central axial line J of a valve seat to be processed with said predetermined rotary axis in an X- and Y-direction two-dimensional plane.

In such a conventional technique, as shown in FIG. 24, in order to inhibit a powdery material P, which is supplied in order to constitute a valve-seat surface, or a powdery material P, which is melted by the laser beam L, from running down into a valve hole or maldistributing, it is held on the table T' in such a state that the central axial line J of the valve seat is inclined with respect to the vertical direction so that the process part W becomes upward, that is, so that the vertical line K with respect to the process part W directs in the absolute vertical direction. And, it is one which irradiates the laser beam L along the line K, which is vertical with respect to the process part W, in the vertical direction while rotating the cylinder head around the axial center line J. That is, it is a technique in which the laser beam is fixed but the cylinder head rotates to carry out laser-clad processing.

However, in such a conventional technique, in addition to inclining the entire cylinder head by a predetermined angle so that a part for forming the valve-seat surface becomes upward as shown in FIG. 24, it is necessary to move the entire cylinder head, a heavy-weight object, rotatably while adapting the central axial line J of the valve seat making the process part to the rotary center. In addition to firmly positioning and holding the cylinder head, such a heavy-weight object, in order to rotate this smoothly, a huge facility as shown in FIG. 25 becomes necessary so that a great deal of equipment investment and facility-installation space have been required.

Moreover, the powdery material, which has remained on the valve-seat portion without melting, has sputtered to the surrounding, because the cylinder head rotates, in actuality, however, its recovery is extremely difficult. Accordingly, the yield ratio of the powder material has degraded, and at the same time there has been a problem as well that the dissipated powder material becomes the cause of troubles at movable parts of the processing apparatus.

The present invention has been done in view of such circumstances, and it is an object to provide a laser-clad processing apparatus which can appropriately and readily form a clad layer at low cost with a simple constitution, and a laser-clad processing method therefor.

DISCLOSURE OF THE INVENTION

A laser-clad processing apparatus of the present invention is one which is a laser-clad processing apparatus for carrying out laser-clad processing onto a valve-seat portion of a cylinder head, and is characterized in that it comprises:

cylinder-head holding means for holding the cylinder head in an inclining manner so that the central axial line of the valve seat becomes the vertical direction;

a laser-processing head for irradiating a laser beam onto a process part of the valve seat, and at the same time discharging a powdery material to the process part;

rotary means which rotates around the central axial line of the valve seat in such a state that the laser-processing head is inclined with respect to the vertical direction; and powdery-material supply means for supplying the powdery material to the laser-processing head.

In the laser-clad processing apparatus of the present invention, it is desirable that the cylinder-head holding means can be equipped with inclination means for inclining the cylinder head between two positions, a first position at which the central axial line of an inlet valve seat becomes parallel to the vertical line and a second position at which the central axial line of an outlet valve seat becomes parallel to the vertical line; and horizontal-movement means for moving the cylinder head in the X-axis direction and in the Y-axis direction, which crosses with the X-axis direction perpendicularly, on a horizontal plane.

Moreover, in the laser-clad processing apparatus of the present invention, it is preferable that the laser-processing head can comprise: laser-beam generation means for generating the laser beam; and a coaxial nozzle through which the laser beam passes and at the same time which discharges the powdery material.

Here, it is preferable that the laser-beam generation means can be such that a plurality of laser diode arrays are disposed, and shapes the laser beam by controlling the laser diode arrays depending on the width direction of the valve-seat portion.

In the laser-clad processing apparatus of the present invention, it is desirable that the powdery-material supply means, while letting the powdery material flow to a predetermined flow-out opening, lets flow it out through the flow-out opening by means of carrier-gas pressure, thereby compressively supplying it to the laser-processing head.

A laser-clad processing method of the present invention is one which is a process for carrying out laser-clad processing onto a valve-seat portion of a cylinder head, and is characterized in that it comprises: holding the cylinder head in an inclining manner so that the central axial line of the valve seat becomes the vertical direction; supplying a powdery material along the valve-seat portion while holding a laser-processing head in an inclined manner with respect to the vertical direction and rotating it around the central axial line of the valve seat; and at the same time irradiating a laser beam to carry out laser-clad processing.

Here, it is preferable that the shape of the laser beam can be a rectangular shape, and it is desirable that the powdery material can be discharged so as to deposit concentratedly within a circle whose diameter is adapted to a side of the rectangular-shaped laser beam, the side crossing with the processing development direction perpendicularly.

Moreover, in the laser-clad processing method of the present invention, it is preferable that the laser-processing head can be rotated normally and can be rotated reversely along the valve-seat portion, and that the powdery material can be melted by irradiating the laser beam behind the deposition center of the powdery material by a predetermined distance with respect to the development direction of laser processing.

Moreover, in the laser-clad processing method of the present invention, it is desirable that, when stopping the compressive supply of the powdery material, the flow of the powder material can be stopped, and the pressure by means of carrier gas can be lowered toward a predetermined value while taking a predetermined time since the time at the flow stoppage or immediately before the flow stoppage.

Moreover, in the laser-clad processing method of the present invention, it is preferable that, before compressively supplying the powdery material, the flow volume of the carrier gas can be increased; immediately before starting the flow of the powdery material, it can be decreased to a steady flow volume; and immediately before the flow stoppage, the carrier gas can be opened to air.

In the present invention, the cylinder head is fixed, and the laser-processing head is rotated around the central axial line of the valve seat while it is inclined, and thereby it is possible to form a clad layer on the inclined valve-seat surface.

Therefore, since it is possible to simplify the constituent elements of laser-clad processing apparatus remarkably compared with the prior art, it is possible to reduce the facility cost by half compared with the prior art. Moreover, it is possible to reduce the facility-installation space remarkably (by about ⅓).

Since the laser-clad processing apparatus of the present invention uses a semiconductor laser, the laser efficiency is high compared with prior-art apparatuses by means of $CO_2$ laser method. Therefore, it is possible to cut the electric-power cost remarkably (by ⅕ approximately). Moreover, since the periodic replacement of laser gas is unnecessary similarly to the $CO_2$ laser method, and further since the replacement of component parts, and the like, is easy, it is possible to reduce the maintenance cost greatly.

In prior-art apparatuses by means of $CO_2$ laser method, a laser beam is such that, because of the space propagation through mirrors, the positioning accuracy has been low due to the errors in respective portions of the mirrors. In accordance the laser processing apparatus of the present invention, since the positioning of workpiece is determined completely by mechanical accuracy alone, it is possible to reduce the drawbacks resulting from the positional displacements of laser beam and powdery material or shield gas (carrier gas), and accordingly it is possible to improve the qualities of valve seat.

Moreover, it is possible to make a powdery material, which has been sputtered conventionally because the cylinder head rotates, collectable by fixing the cylinder head. That is, it is possible to improve the yield ratio of powdery material, and at the same time it is possible to solve the drawback (cause of troubles) at movable parts of the processing apparatus, drawback which results from the sputtering of powdery material.

In accordance with the laser-clad processing method, since it is possible to form a clad layer while changing the rotary direction of the laser-processing head for every valve seat, it is possible to shorten the processing cycle time.

BEST MODE FOR CARRYING OUT THE INVENTION

An embodiment mode of the present invention will be hereinafter described in detail with reference to the drawings. Note that like symbols shall designate like parts or corresponding parts.

Laser-Clad Processing Apparatus

Figure 1:
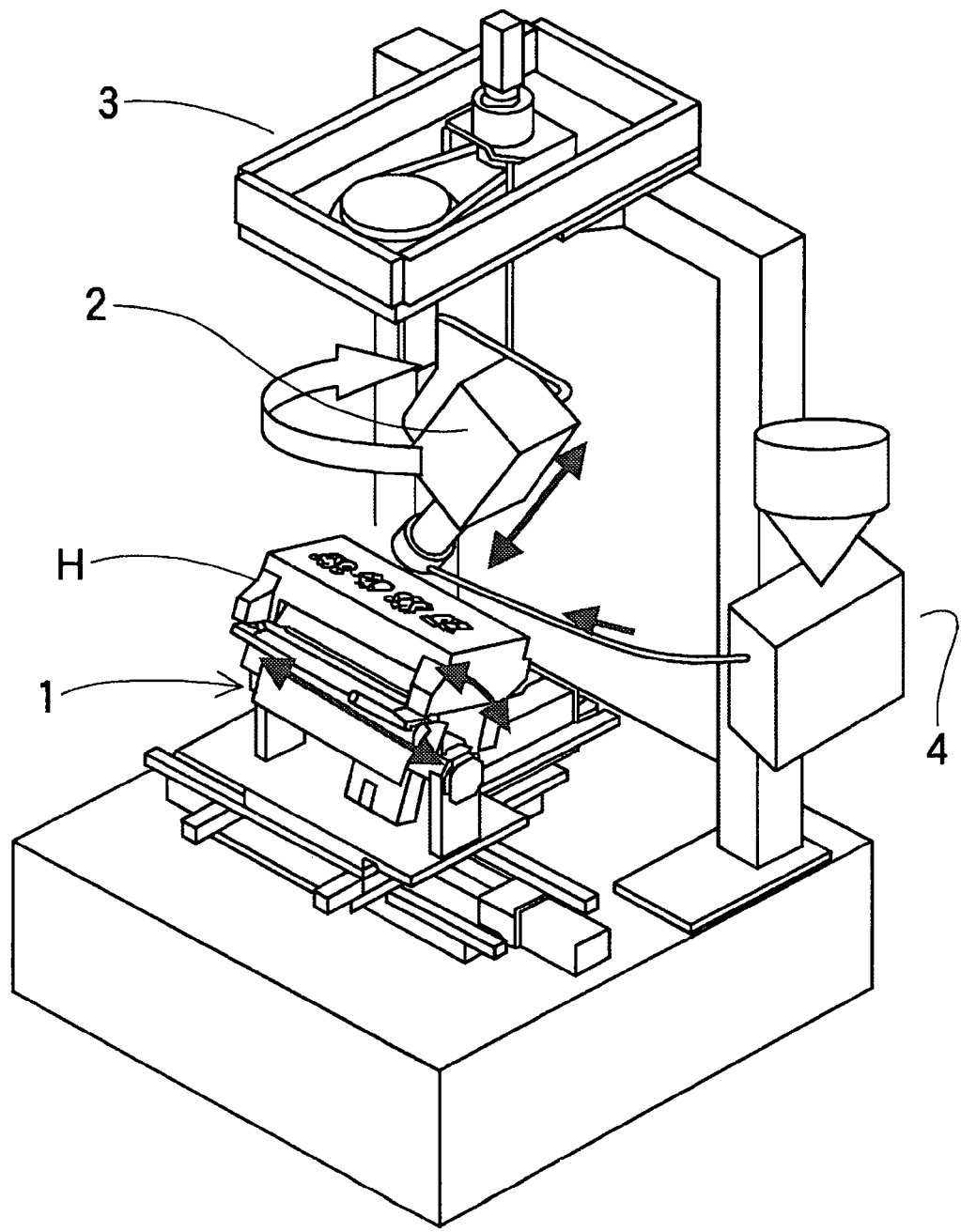
FIG. 1 is a perspective diagram for illustrating a major constitution of a laser-clad processing apparatus of the present invention. 1 is cylinder-head holding means, 2 is a laser-processing head, 3 is rotary means, 4 is powdery-material supply means, and H is a cylinder head.

The entire constitution of a laser-clad processing apparatus of the present invention is shown in the perspective diagram of FIG. 1.

The laser-clad processing apparatus of the present invention is for carrying out laser-clad processing onto a valve-seat portion of a cylinder head H, and is constituted of cylinder-head holding means 1 for holding the cylinder head H in an inclining manner, a laser-processing head 2 for irradiating a laser beam onto a process part, and at the same time discharging a powdery material, rotary means 3 which rotates around the vertical line while holding the laser-processing head 2 inclinably to the vertical direction, and powdery-material supply means 4 for supplying the powdery material to the laser-processing head 2.

Figure 2:
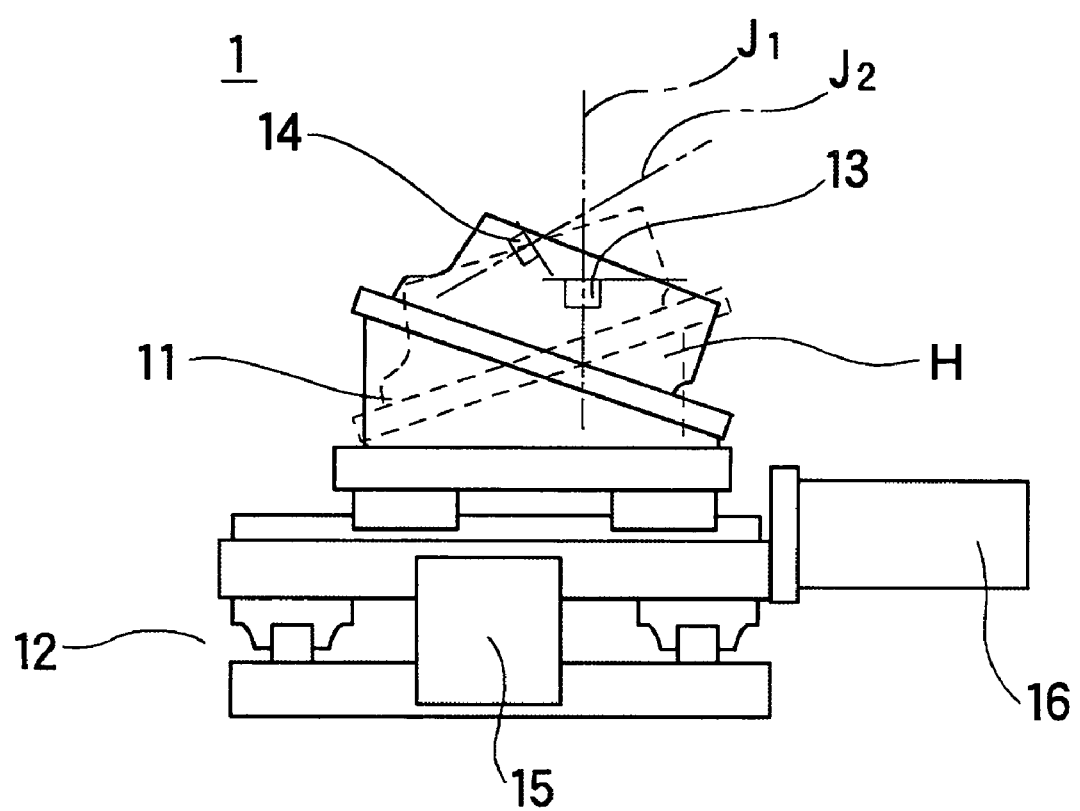
FIG. 2 is a rough diagram on a side face of the cylinder-head holding means, wherein the cylinder head H can move inclinably as like the dotted lines.

FIG. 2 is a rough diagram on a side face of the cylinder-head holding means 1 in the present embodiment mode. The cylinder-head holding means 1 is equipped with inclination means 11 for inclining the cylinder head H so that the central axial line of valve seat becomes the vertical direction, and horizontal-movement means 12 being capable of moving the cylinder head H in the X-axis direction and in the Y-axis direction in a horizontal plane. The inclination means 11 becomes such a mechanism that it is made inclinable by a not-shown air cylinder, and the like, between a first position (designated with the solid lines), at which the central axial line J1 of an inlet-valve seat 13 becomes parallel to the rotary axis V of the laser processing head, and a second position (designated with the dotted lines), at which the central axial line J2 of an outlet-valve seat 14 becomes parallel to the rotary axis V of the laser processing head. Moreover, the horizontal-movement means 12 can move the cylinder head H, along with the inclination means 11, in the horizontal direction by an X-axis servomotor and a Y-axis servomotor 16, and can let the central axial line of valve seat coincide with the rotary axis of the laser-processing head. Further, this horizontal-movement means can be equipped with a mechanism which is also capable of index feeding for positioning by a servomotor, and so forth.

Figure 3:
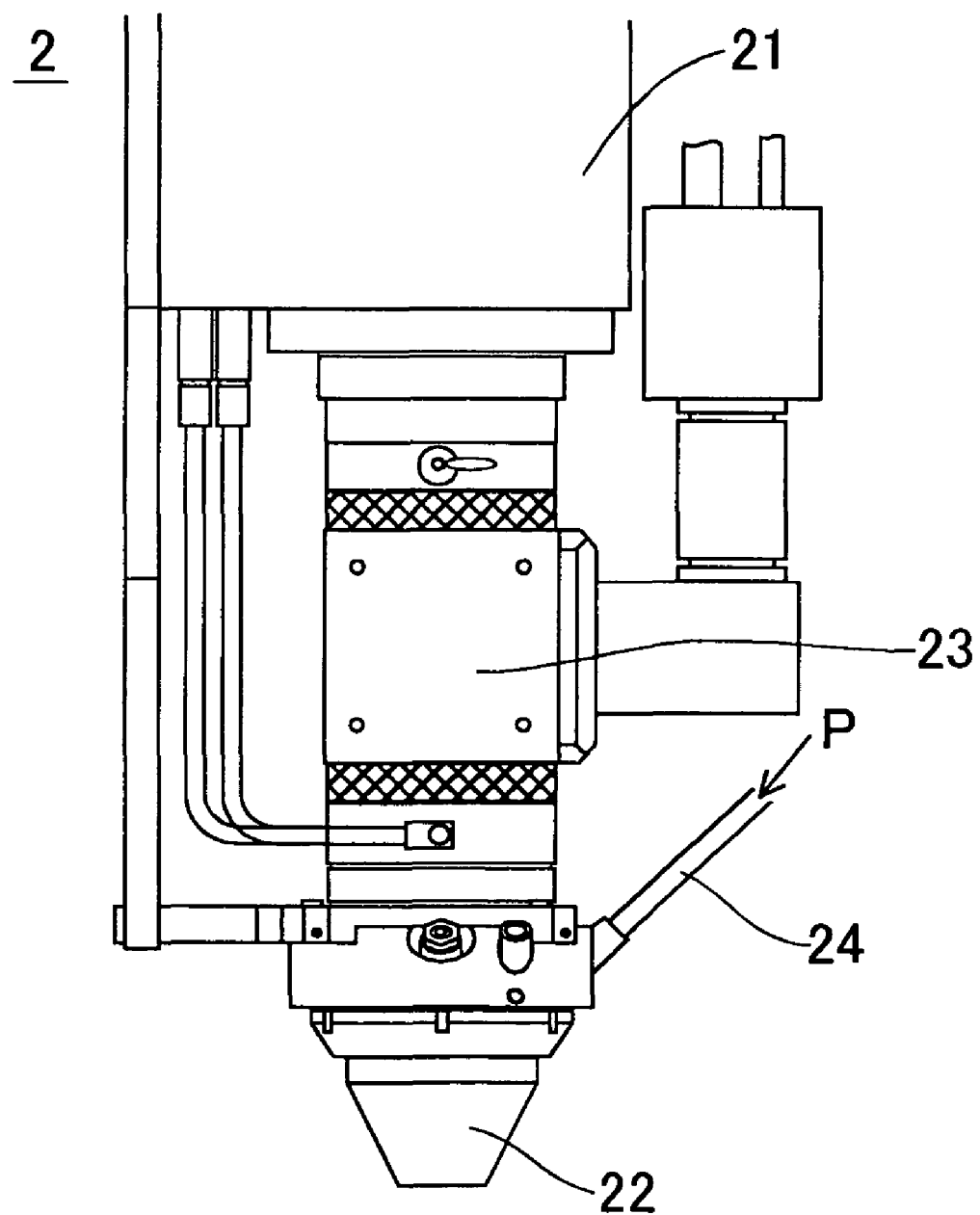
FIG. 3 is a rough diagram on a front face of the laser-processing head 2. 21 is laser-generation means, 22 is a coaxial nozzle, 23 is a laser optical system, and 24 is a supply hose for a powdery material P.

A rough constitution of the laser-processing head is illustrated in FIG. 3. The laser-processing head 2 is constituted of laser generation means 21 for generating a laser beam, and a coaxial nozzle 22 through which the laser beam passes and at the same time which discharges a powdery material. The laser generation means 21 and the coaxial nozzle 22 are connected integrally by way of an optical-system portion 23 which condenses the laser beam. To the coaxial nozzle 22, a supply hose 24, which supplies a powdery material P to this nozzle portion, is connected.

In the present embodiment mode, the laser generation means 21 is equipped with a semiconductor laser oscillator, and a collimation lens, which adjusts the shape of laser beam, and a condenser lens are disposed in the optical-system portion 23.

Figure 4:
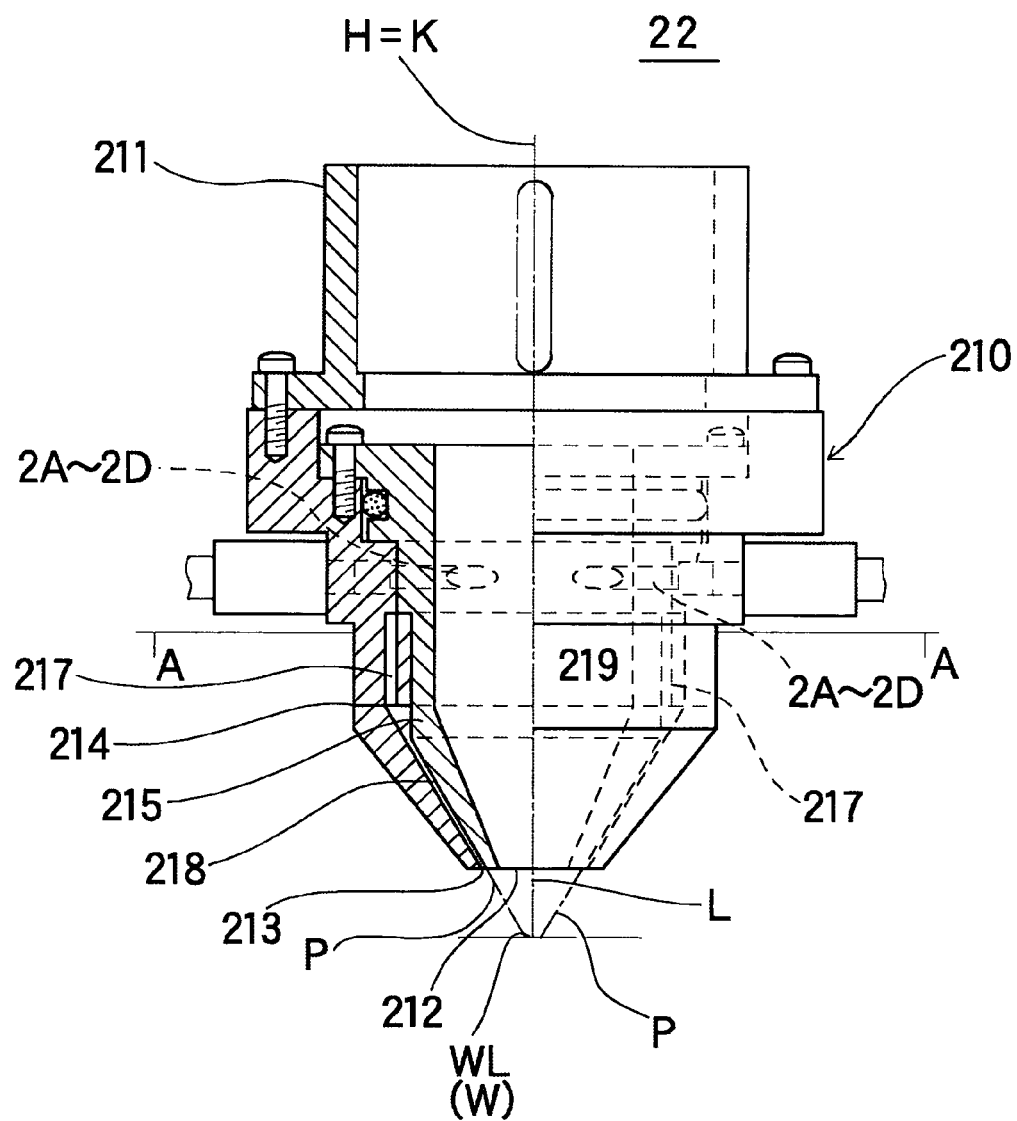
FIG. 4 is a partially cut-away cross-sectional side diagram for illustrating a major part of the coaxial nozzle 22 of the laser-processing head 2.
Figure 5:
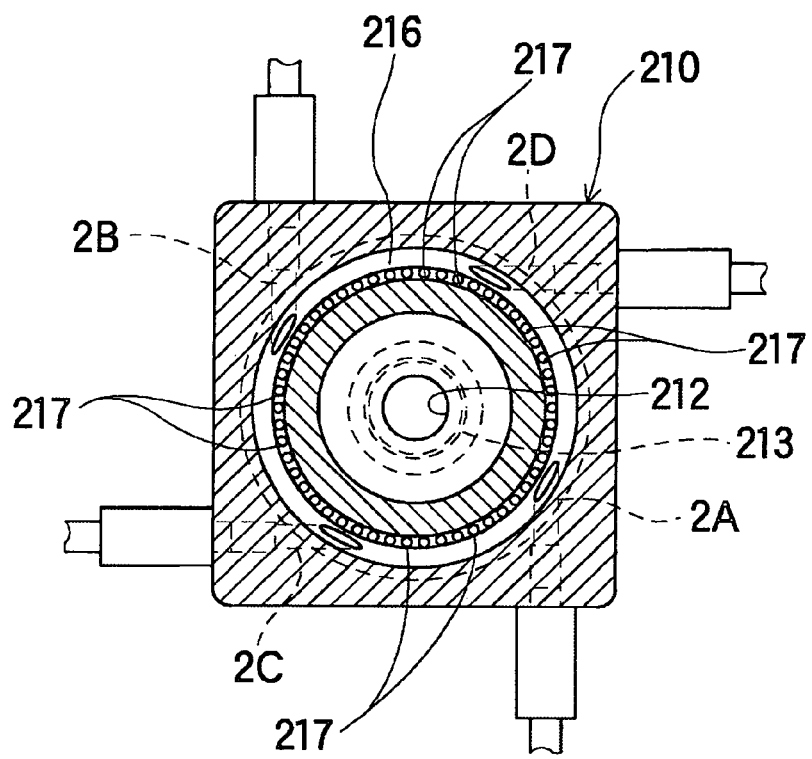
FIG. 5 is a rough diagram on the A-A cross section of FIG. 4. 212 is a laser-beam irradiation aperture, 213 is a powdery-material discharge opening, 216 is a swirler portion for a powdery material, and 217 is a rectifier portion for the powdery material.

The coaxial nozzle 22 is a nozzle in which the irradiation axis of laser beam and the discharge axis for discharging a powdery material to a process part are formed coaxially, and is one which is illustrated in FIG. 4 and FIG. 5 in the present embodiment mode. FIG. 4 shows a vertical cross section of the coaxial nozzle, moreover, the A-A cross section of FIG. 4 is shown in FIG. 5.

The coaxial nozzle 22 is equipped with a nozzle portion 210, which irradiates a laser beam L with respect to a process part W and at the same time discharges a powdery material to a laser-beam-irradiation portion WL of the process part W, a plurality of material-introductory portions 2A-2D which supply a powder material to this nozzle portion, and control means (the diagrammatic representation is abbreviated), which adjusts and controls the supply amount of the powder material P through the respective material-introductory portions 2A-2D so as to let the powdery material P discharge to the laser-beam-irradiation portion WL in a predetermined proportion from the periphery along with a carrier gas, and is one which is adapted so that it can form a clad layer in such a state that the coaxial nozzle 22 is inclined with respect to the vertical direction depending on the inclination of the process part W. The control means is one which adjusts the supply amount of the powdery material P through the respective material-introductory portions 2A-2D based on the inclination angle of the coaxial nozzle 22.

The coaxial nozzle 22 is constituted of a connector member 211, which is connected with the laser generation means 21, an irradiation aperture 212, through which the laser beam L is irradiated with respect to the process portion W, a nozzle portion 210, which has a discharge opening 213 for discharging the powdery material P to the laser-beam-irradiation portion WL from the periphery along with a carrier gas. The nozzle portion 210 is constituted of an outside nozzle member 214, and an inside nozzle member 215, which is fitted inwardly into this outside nozzle member 214.

Between the outside nozzle member 214 and the inside nozzle member 215, a swirler portion 216, which is connected with a plurality of the material-introductory portions 2A-2D and in which the powdery material P, being supplied along with a carrier gas, is swirled around the axial line H of the coaxial nozzle 22; a rectifier portion 217, which rectifies the powdery material P, being swirled by a predetermined distance at the swirler portion 216, along the axial line H of the coaxial nozzle 22 along with a carrier gas; and the discharge opening 213, through which the powder material P is discharged to the laser-beam-irradiation portion WL of the process part W from the periphery over the entire periphery along with the carrier gas, are formed continuously. Moreover, at the center of the inside nozzle member 215, a beam passage 219, which has the irradiation aperture 212 through which the irradiated laser beam L passes toward the process part W, is formed.

As shown in FIG. 5, in the outside nozzle member 214, four passages 2A, 2B, 2C and 2D, as a plurality of the material-introductory portions, are drilled through at equal intervals so as to extend in the tangential direction of the swirler portion 216, in the case of this embodiment mode. The swirler portion 216 is one which is constituted of an annular space formed around the axial line H of the coaxial nozzle 22, and is formed as a tapered shape which reduces diametrically from the base-end portion (upward) toward the leading-end portion (downward) gradually. The rectifier portion 217 in this embodiment mode is constituted of a plurality of hole-shaped passages which are formed so as to extend between the bottom surface of the swirler portion 216 and a discharge portion 218 in a diametrically-reduced portion, which is formed on the inner peripheral surface of the outside nozzle member 214 so as to protrude. The discharge portion 218 is constituted of a clearance to which the discharge opening 213 opens toward the laser-beam-irradiation portion WL of the process part W. Therefore, as shown in FIG. 4, it is set up coaxially so that the optical axis of the laser beam L, which is irradiated to the process part W, coincides with the discharge center of the powder-like material P, which is discharged from the periphery.

In the thus constituted coaxial nozzle 22, when the powdery material is introduced into the swirler portion 216 in the tangential direction by a carrier gas by way of the passages 2A-2D, it comes to flow into the rectifier portion 217 after it swirls in the swirler portion 216 by from about 90 degrees to 180 degrees approximately from the respective passages 2A-2D into which it is introduced. And, by passing through the rectifier portion 217 which is formed parallely to the axial line H of the coaxial nozzle 22, the powdery material P is rectified so as to flow parallel to the axial line H. Thereafter, the powdery material P comes to be supplied equally toward the laser-beam-irradiation portion WL of valve seat from the periphery through the discharge opening 213.

In the present invention, in a state that the axial line H of the coaxial nozzle 22 is inclined by a predetermined angle depending on the inclination of valve seat, it is driven so as to rotate around the vertical-direction axial line. In this instance, the gravitational force, which the powdery material P introduced into the swirler portion 216 receives, comes to be different according to the directions of the respective passages 2A-2D. Accordingly, maldistribution comes to occur in the amount of the powdery material P, which is discharged through the discharge opening 213 toward the laser-beam-irradiation portion WL from the periphery, and this maldistribution differs according to the inclination of the axial line H of the coaxial nozzle 22.

Hence, in the present embodiment mode, it is constituted so that it can change the amounts of the powdery material P, which is introduced through the passages 2A-2D by a carrier gas, so as to make the amounts of the powdery material P equal, powdery material P which is discharged toward the laser-beam-irradiation portion WL through the discharge opening 213 by way of the rectifier portion 217, depending on the respective directions of the passages 2A-2D, which supply the powdery material P to the swirler portion 216, when the coaxial nozzle 22 is inclined with respect to the vertical direction, and additionally it can make the degree of the change variable based on the inclination angle of the axial line H of the coaxial nozzle 22.

Figure 24:
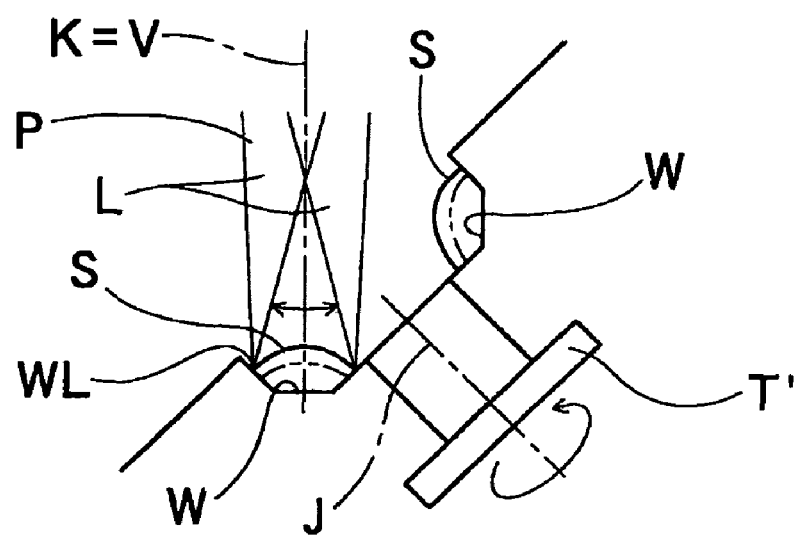
FIG. 24 is a schematic diagram of the cross-section of valve seat for explaining the prior-art laser-clad processing method.
Figure 25:
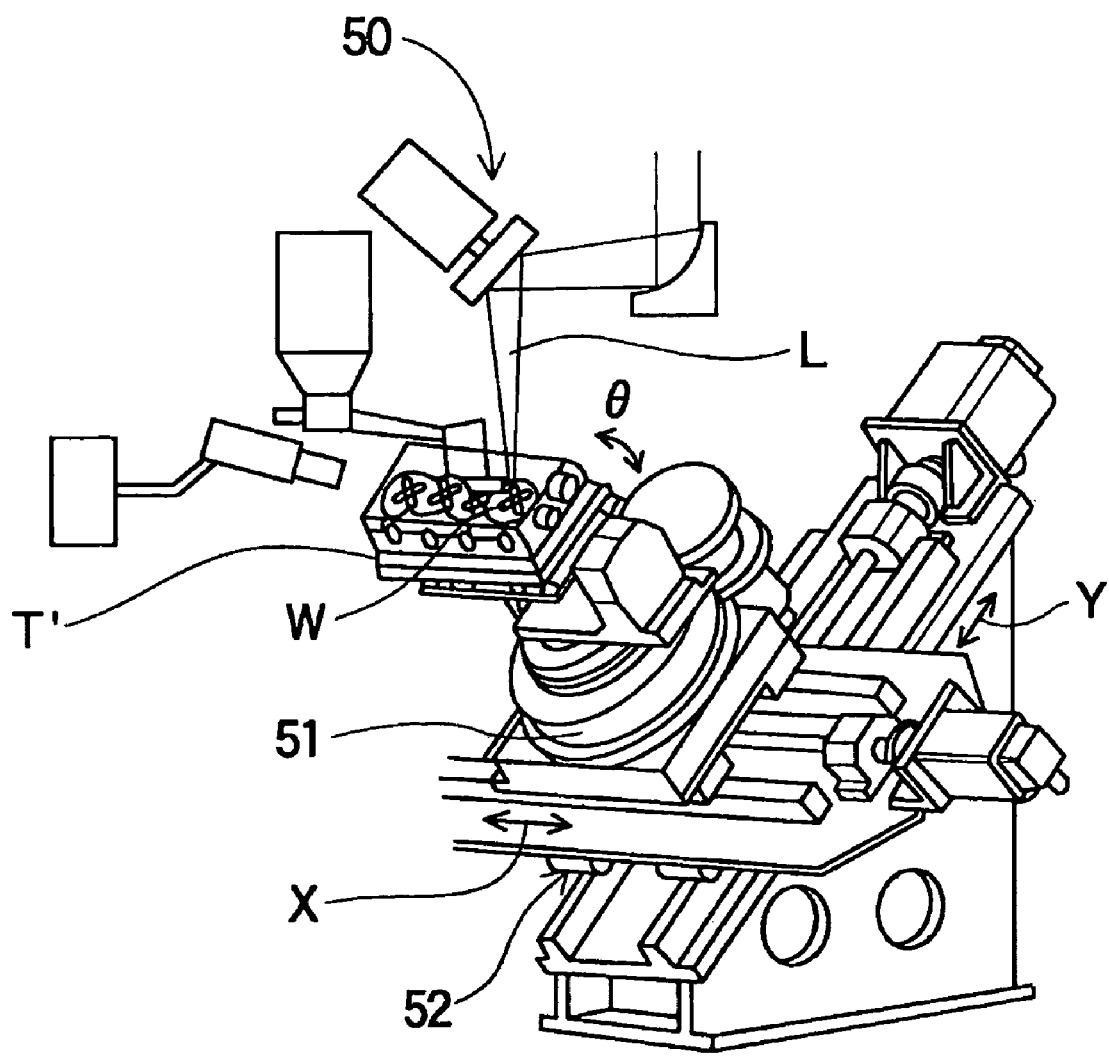
FIG. 25 is a rough diagram for illustrating the major constitution of the prior-art laser-clad processing apparatus.

Therefore, by using the laser-processing head equipped with the present coaxial nozzle, the cylinder head is not held on the table T' in such a manner, like the prior-art technique (see FIG. 24), that the central axial line J of valve seat is inclined so as to direct the perpendicular line with respect to the process part W, on which the clad layer S of valve seat is formed, in the vertical direction, and additionally it is not necessary to rotate it around the central axial line J. Accordingly, in this embodiment mode, the cylinder head can be held on the table T with ease so that the central axial line J of valve seat becomes the vertical direction, and moreover, by rotating the laser-processing head 2 while inclining it, it is possible to form the clad layer S on the inclined annular process part W of valve seat adequately and with ease.

In the present embodiment mode, it is desirable that the irradiation profile of laser beam can be rectangular. The method of shaping a laser beam to a rectangular profile is not limited in particular, and it is possible to exemplify a method of irradiating a general laser light after turning it into multi-mode, in which it is continuous with a width provided with a laser strength of predetermined level, using a cylindrical lens, and the like, and a method of irradiating it after shaping it to a laser beam of desired profile by disposing a plurality of laser diode arrays, and so forth.

Figure 6:
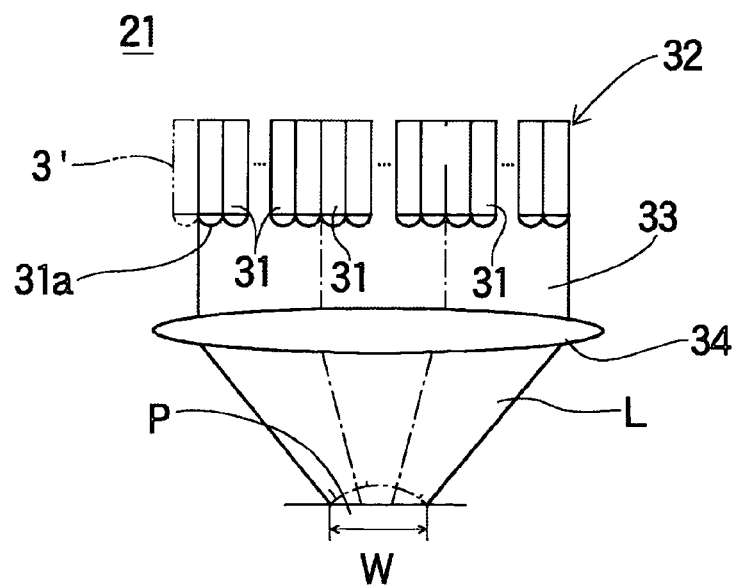
FIG. 6 is an explanatory diagram on a laser diode array as laser generation means, wherein 31 is a laser diode array, 31a is a laser emission aperture, 33 is a micro lens, and 34 is a condenser lens.

In FIG. 6, laser generation means having a plurality of laser diode arrays is shown schematically. This laser generation means 21 is equipped with a laser beam source 32, which is constituted by disposing a plurality of laser diode arrays 31 so as to make it possible to irradiate a laser beam in the width direction of the process part W, and control means (the diagrammatic representation is abbreviated), which controls the respective laser diode arrays 31 so that the laser beam L, shaped depending on the width direction of the process part W, can be irradiated.

The laser diode arrays 31 are those one which comprise a gallium-arsenic-based semiconductor laser device, for instance, and it is possible to adjust the beam intensity by controlling supplied electric current. And, the respective laser diode arrays 31 are such that a plurality of laser emission apertures 31a are disposed in one of its faces and further a micro lens 33 is fastened to the one face in which the laser emission apertures 31a are positioned. From the respective laser emission apertures 31a, a laser beam whose length is 100 μm approximately and width is 1.0 g/m is emitted, and, since the micro lens 33 is disposed in front of them, it is possible to irradiate parallel laser beams whose length is 1 cm approximately and width is 1 mm. This laser beam L is such that it is possible to irradiate it so as to be a definite step-shaped energy distribution, and additionally it is possible to maintain it at stable level.

The laser diode arrays 31, each of which is thus constructed, are disposed above the powdery material P in the width direction in the present embodiment mode, as shown in FIG. 6, and thereby constitute the laser beam source 32. To the respective laser beam arrays 31, a control apparatus (not shown) is connected, respectively, and an electric current, which is controlled so as to make it possible to irradiate the laser beam at predetermined output, is supplied. The laser beam source 32 is set up so that, when a supply electric current is controlled at 100%, it is possible to irradiate the laser beam L in total of approximately 4 kw output, for instance. Between the laser beam source 32 and the powdery material P, a condenser lens 34 is interposed/disposed. The interval between the laser beam source 32, or the condenser lens 34, and the powdery material P, that is, the focal distance, is made adjustable relatively depending on needs. The number of the laser diode arrays 31, which are disposed in the width direction of the deposited powdery material P, is set up so that the width of the laser beam L, which is irradiated to the powder material P, becomes the width W of the deposited powdery material P or more at least.

By the laser-beam generation means constructed as above, it is possible to obtain a rectangle-shaped laser beam which has a stable energy distribution.

Note that the laser-processing head of the present invention is placed movably up and down along the irradiation axis of laser, and thereby it is possible to adjust the relative distance to the cylinder head depending on requests.

Next, the powdery-material supply means of the present embodiment mode will be described.

The powdery-material supply means in the laser-clad processing apparatus of the present invention is means for compressively supplying a powdery material to the laser head, means which lets it flow out through a predetermined flow-out opening by means of a pressure of carrier gas while letting it flow to the flow-out opening quantitatively.

Figure 7:
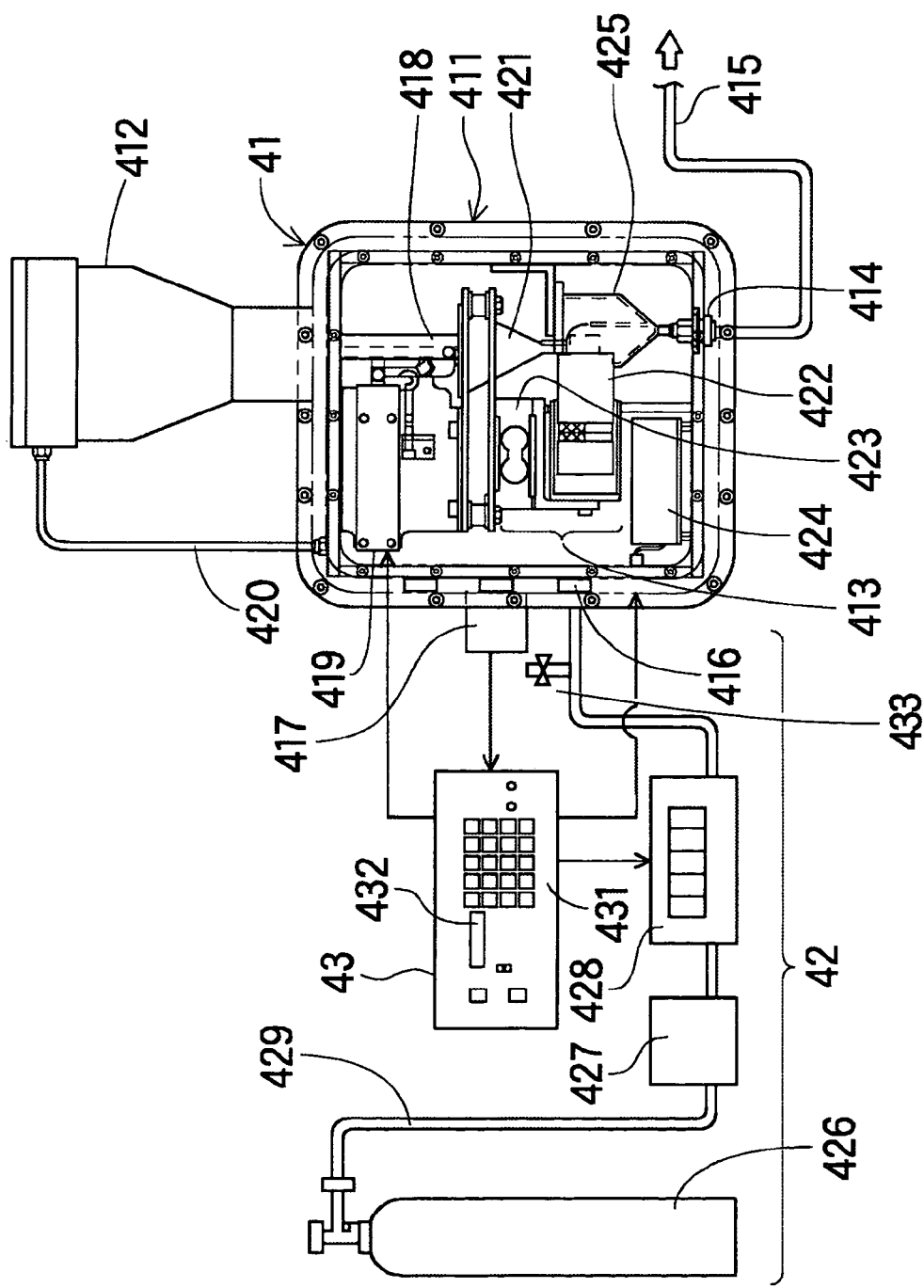
FIG. 7 is an explanatory diagram for illustrating powdery-material supply means in an embodiment mode of a laser-clad processing apparatus of the present invention. 41 is a powder feeder, 42 is a pressure-supplying device, 43 is a control device, 411 is an airtight container, 412 is a hopper for supply, 413 is an ultrasonic-vibration sending-out machine (ultrasonic feeder), 417 is a pressure sensor, 421 is a metering hopper, 423 is a load cell, and 428 is a mass flow controller.

In FIG. 7, a rough construction of the powdery-material supply means 4 is shown. The powdery-material supply means 4 is one which compressively supplies the powdery material P to the coaxial nozzle 22 of the laser-processing head 2 by means of a pressure of carrier gas, and is equipped with a powder supplying machine 41, a pressure-supplying apparatus 42 for supplying a pressure resulting from a carrier gas to the powder supplying machine 41, and a control apparatus 43 for controlling the powder supplying machine 41 and pressure supplying apparatus 42.

The powder supplying machine 41 is equipped with a pressure-resisting type airtight container 411, a supplying hopper 412, which is installed to the airtight container 411 from outside, an ultrasonic-vibration sending-out machine (hereinafter referred to as ultrasonic feeder) 413, which is accommodated airtightly in the airtight container 411.

The airtight container 411 is such that a flow-out opening (shown as a pipe fitting in the drawing) 414 for letting a powder flow out to the outside is disposed. The flow-out opening 414 is such that a hose 415 for leading the powdery material P to the coaxial nozzle 22 of the laser-processing head is connected. Moreover, in the airtight container 411, an introductory opening (shown as a pipe fitting in the drawing) 416 for introducing a pressure resulting from a carrier gas, and a sensor 417 for detecting a pressure (inner pressure) within the airtight container 417 are disposed.

The replenishing hopper 412 is one which is for accommodating the powdery material P for replenishment, is fixed to the top side of the airtight container 411, and is communicated with the airtight container 411 through a throttle hole disposed in its bottom. The top side of this hopper 412 is sealed by a cover plate.

In the inside of the airtight container 411, a guide pipe 418 for guiding the powdery material P, which falls from the throttle hole of the replenishing hopper 412, downward is disposed, and the fall of the powdery material P is allowed/regulated by a replenishing valve 419.

Between the airtight container 411 and the replenishing hopper 412, a bypass pipe 420 is disposed, and it is possible to reduce the internal-pressure difference between the airtight container 411 and the replenishing hopper 412.

To the lower side of the valve mechanism 419, the ultrasonic feeder 413 is installed by way of a bracket. The ultrasonic feeder 413 is one which lets the powder material P, which is replenished from the replenishing hopper 412 and is accommodated in a metering hopper 421, flow to the flow-out opening 414 of the airtight container 411 quantitatively. This ultrasonic feeder 413 is made so that it sends out the powdery material P to the flow-out opening 414 by means of ultrasonic vibration quantitatively and continuously.

The ultrasonic feeder 413 is equipped with an ultrasonic motor 422, a load cell 423, a motor driving circuit 424, the metering hopper 421, and a terminal-stage hopper 425.

In FIG. 7, the pressure-supplying apparatus 42 is one which is for supplying a pressure resulting from a carrier gas to the flow-out opening 414 of the airtight container 411 by supplying the carrier gas into the same container 411. The pressure-supplying apparatus 42 is equipped with a bomb 426 being a supply source of the carrier gas, a gas regulator 427, and a mass flow controller 428, and they are connected serially by piping 429. The output side of the mass flow controller 428 is connected with the introductory opening 416 of the airtight container 411. The carrier gas is adjusted to a predetermined flow volume at the mass flow controller 428 after the pressure is adjusted at the gas regulator 427, and is introduced into the airtight container 411 through the introductory opening 416.

The control apparatus 43 is one which controls the ultrasonic feeder 413 and pressure supplying apparatus 42 in order to compressively supply the powdery material P to the coaxial nozzle 22 of the laser-processing head 2 by flowing it out through the flow-out opening 414 of the airtight container 411 by the pressure resulting from the carrier gas. To this control apparatus 43, the pressure sensor 417, the replenishing valve 419, the motor driving circuit 424 and the mass flow controller 428 are connected electrically. On the front face of the control apparatus 43, an operation panel 431 including various switches, and an indicator 432 are disposed.

By using the powdery-material supply means comprising the above constitutions, it is possible to compressively supply a powdery material to a laser-processing head by flowing it out through a predetermined flow-out opening by means of carrier gas while flowing it to the flow-out opening quantitatively.

Laser-Clad Processing Method

Next, a laser-clad processing method of the present invention will be described with reference to the drawings.

The laser-clad processing method of the present invention is a processing method for forming a clad layer on a valve-seat portion of a cylinder head, processing method in which a cylinder head is inclined so that the central axial line of valve seat becomes the vertical direction, and is held threat; and a clad layer is formed by supplying a powdery material to the process part of valve seat and at the same time irradiating a laser beam thereto while rotating around the central axial line of valve seat in such a state being inclined with respect to this vertical direction.

Figure 8:
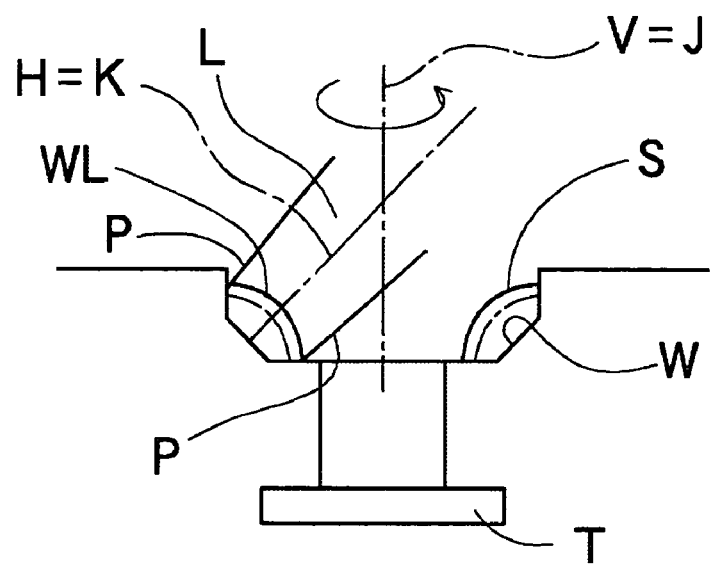
FIG. 8 is a cross-sectional schematic diagram on a valve-seat portion for explaining a laser processing method of the present invention. J (V) is the central axial line of a valve seat, and H (K) is the axial center line of a laser-processing head.

FIG. 8 is a schematic cross-sectional diagram of a valve seat portion of a cylinder head. First of all, the cylinder head is held by a table T so that the central axial line J of a valve seat becomes the vertical direction V. While matching the axial center line H of a laser-processing head with the vertical direction (K-axis) with respect to a process part WL and rotating it around the central axial line J of the valve seat, a powdery material P is discharged to the process part WL, and is irradiated with a laser beam L to form a clad layer S.

In the laser-clad processing method of the present invention, it is desirable that a laser beam to be irradiated to a process part can be a rectangular shape. It is preferable that a laser beam, which is emitted from a laser oscillator, can be condensed so that it becomes a rectangular shape at around the concentration portion of a powdery material, which is discharged to the process part of a valve seat by a coaxial nozzle of a laser-processing head. In this instance, an optical system, such as lenses, is designed so that one side of the rectangular-shaped laser beam (one of the sides which cross with the processing development direction, hereinafter referred to as a side A. Note that the sides neighboring the side A are referred to as sides B) becomes a length which is matched with the width direction of a valve seat.

Figure 9:
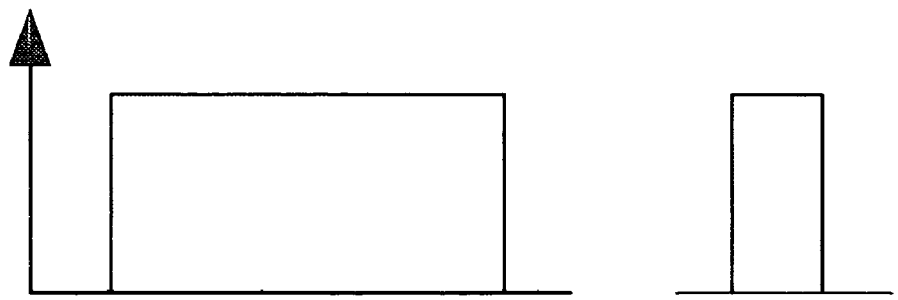
FIG. 9 is a diagram for illustrating an ideal energy distribution of laser beam, wherein the left diagram is an energy distribution in the direction of side A of laser beam, and the right diagram is an energy distribution in the direction of side B of laser beam.

The energy distribution of laser beam can desirably be a rectangle as illustrated in FIG. 9. In FIG. 9, the vertical axis specifies the strength of laser beam's irradiation energy, the left diagram is the energy distribution of laser beam in the side A direction, and the right diagram shows the energy distribution in the side B direction. That is, it is desirable that the profile of laser beam's irradiation plane can be a rectangle composed of the side A and side B, and moreover that its energy distribution can be uniform in the width direction of a valve seat.

Figure 10:
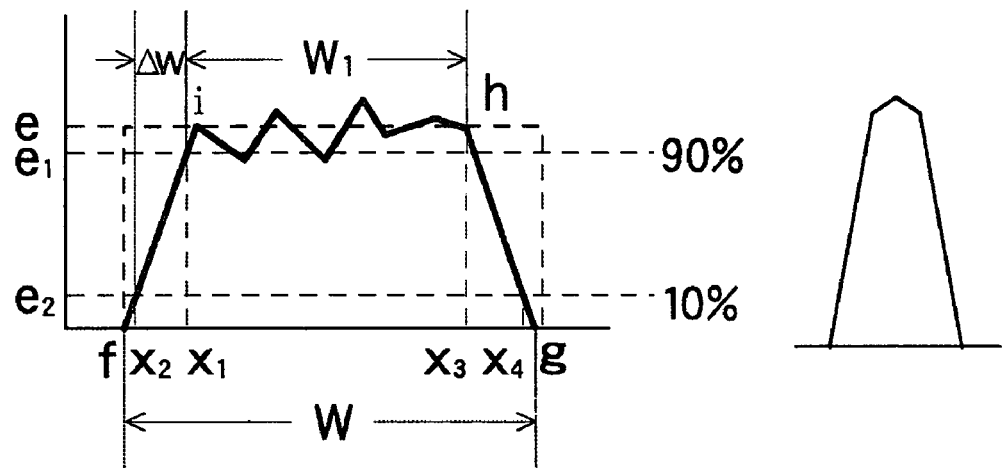
FIG. 10 is a diagram for illustrating an example of a laser-beam energy distribution.

In FIG. 10, an example of the energy distribution of rectangle-shaped beam is shown. In this example, it shows a trapezoid-shaped energy distribution whose central part is substantially flat with respect to the built-up width of a valve seat and whose left and right sides are inclined. In a laser beam in which these inclined parts are large, that is, in a laser beam whose irradiation energy at the central portion in the beam's width direction is higher than at the side-edge portions, since the inlet heat quantity becomes abundant at the central portion of a process part, the dilution concentration of aluminum into a clad layer becomes high at the widthwise central portion so that drawbacks, such as the generation of cracks and the degradation of wear resistance, might occur.

The dilution concentration of aluminum into a clad layer increases as the inclined portions enlarge. Here, the size of the inclined portions, specified by $\Delta w$ of FIG. 10, will be defined as follows.

Let the energy strength at the flat portion (central portion) in the left diagram of FIG. 10 be e, the energy distribution of laser beam is a trapezoid (fghi) whose lower base (fg) is w, upper base (hi) is w1 and height is e. Here, when the energy strength e is taken as 100%, let the 90% energy level be e1, moreover, the 10% energy level be e2, the X coordinate of the intersection of the hypotenuse fi with e1 and e2 be x1 and x2, respectively, and that of the hypotenuse gh therewith be x3 and x4. Here, the size $\Delta w$ of the inclined portions are defined as $\Delta w1=x1-x2$, and $\Delta w2=x4-x3$.

Figure 11:
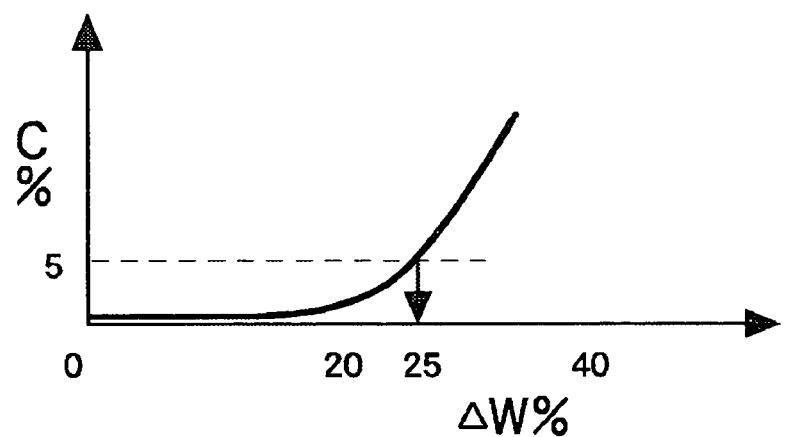
FIG. 11 is a diagram for illustrating an example of a relationship between an inclination-portion proportion Δw of laser beam of FIG. 10 and a dilution ratio C of aluminum into clad layer.

The dilution concentration (C %) of the clad layer's aluminum increases sharply as the proportion of this inclined portions' size increases: $\Delta w$ % ($\Delta w/w \times 100$), as shown in FIG. 11, when $\Delta w$ % exceeds 25%, the dilution concentration (C %) of aluminum comes to exceed 5% by weight with respect to the clad layer. When the dilution concentration (C %) of aluminum comes to exceed 5% by weight, the risk of the generation of cracks and the degradation of wear resistance increase sharply. Therefore, it is desirable that the proportion $\Delta w$ % of the size of laser beam's inclined portions can be less than 25%.

Figure 12:
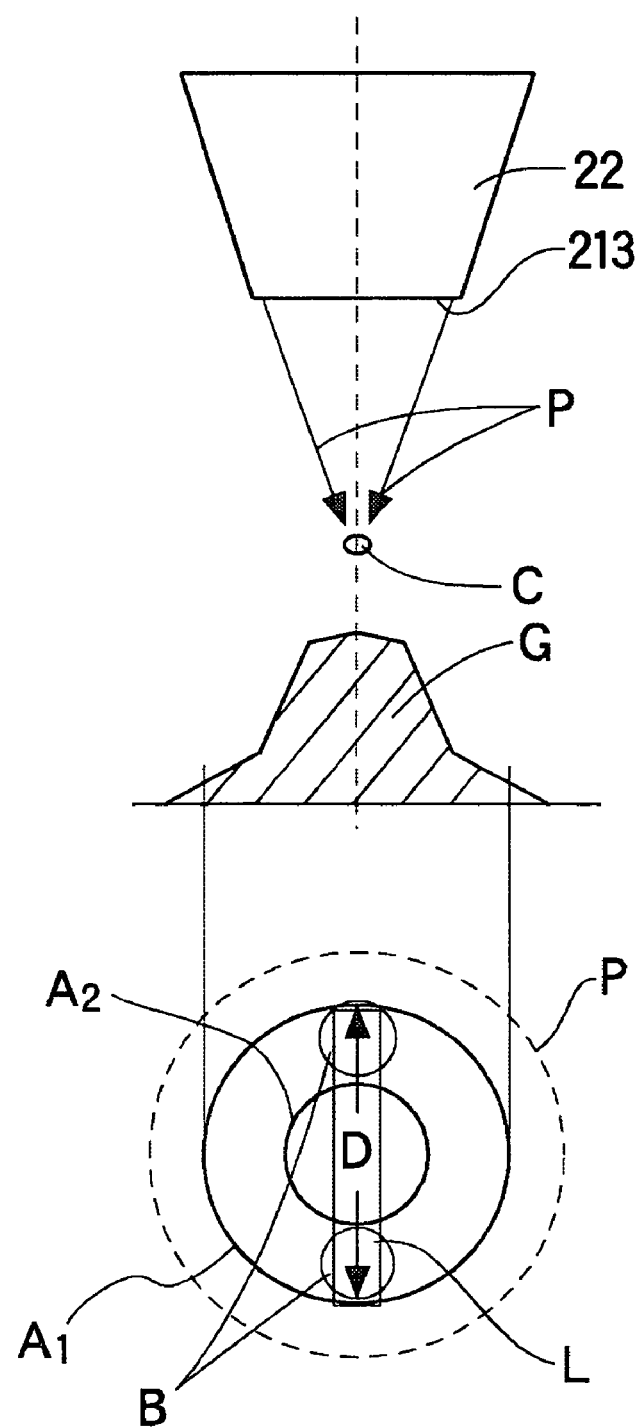
FIG. 12 is an explanatory diagram for explaining a powdery-material deposition concentration. C is the concentration point of powdery material and the powdery material deposits on a process part with a Gaussian distribution G.

In the laser-processing head of the present invention, laser-processing head which has the coaxial nozzle, the powdery material P is discharged so as to concentrate at one point C on the axial center of nozzle through the leading-end discharge opening 213 after it is rectified inside the nozzle 22, as shown in FIG. 12. Accordingly, the powdery material is deposited on a process part with an axially symmetric Gaussian distribution as shown with the oblique lines of FIG. 12. Here, by enhancing the concentration degree onto the inside of a circle (for example, A1) whose diameter is the length D of the rectangle-shaped laser beam L's side A, it is possible to improve the yield ratio of powdery material. This is because the degree of multiplex-reflecting laser beam is abundant at the portion where a powdery material is concentrated, and therefore it absorbs the irradiated laser beam abundantly so that it is likely to be heated.

However, when the concentration degree of powdery material is too high as the circle A2 and accordingly it is smaller than the length D of the laser beam L's side A, at the portions B where the powdery material P is not supplied, the melting of host-material aluminum is facilitated when they are irradiated with the laser beam L, and consequently the quality of clad layer degrades. Accordingly, it is desirable that the concentration degree of the powdery material P can be adapted to from 90 to less than 100% within a circle whose diameter is D.

Note that, when the concentration degree of the powdery material P is high like the circle A2, it is advisable to displace the focus of the laser beam L from the concentration point C of the powdery material P upward/downward to adjust the relative distance between the laser processing head and the cylinder head so that the melting of the powder material P becomes optimum.

The laser-processing head of the present invention becomes the constitution in which the semiconductor laser generation means for generating a laser beam and the coaxial nozzle are connected integrally. Therefore, along the process part of valve seat, it is impossible to infinitely rotate the laser-processing head around the vertical line in one direction. Accordingly, when laser-processing a valve seat at one location and then laser-processing the next valve seat, it is possible to think of reversing (rewinding) the laser-processing head to the initial position in advance. However, since this rewinding operation not only hinders the productivity but also degrades the durability of facility, it is not desirable.

Figure 13:
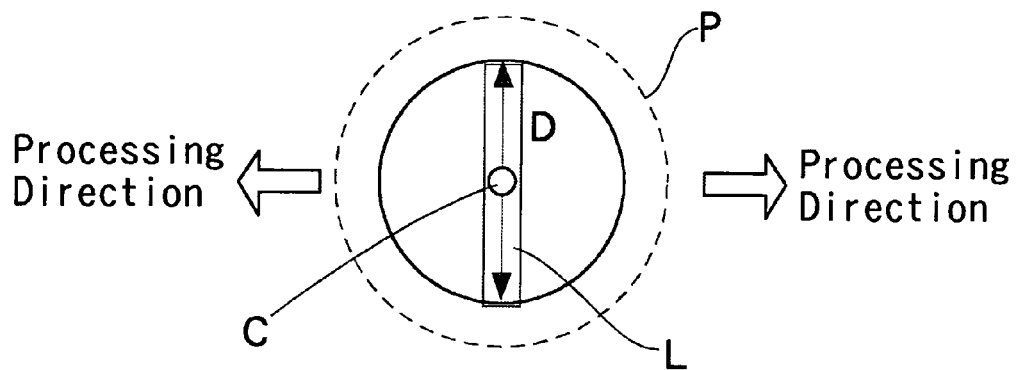
FIG. 13 illustrates the bi-directionality of laser processing.

In the laser-clad processing apparatus of the present invention, as shown in FIG. 13, the positional relationship between the laser beam L and the deposited powdery material P is such that there is no change according to the development directions of processing, and the irradiation center of laser beam always coincides with the deposition center C of powdery material. That is, in accordance with the laser-clad processing method of the present invention, it is possible to make the process-developing direction of clad processing advanceable/retractable, which has been impossible in the prior art. Therefore, when utilizing this characteristic of the present invention, in the case of laser-processing a valve seat at one location and then laser-processing the next valve seat, since it is possible to perform the laser processing while reversing the laser-processing head, it is possible to eliminate the waste of carrying out the rewinding operation only.

Figure 14:
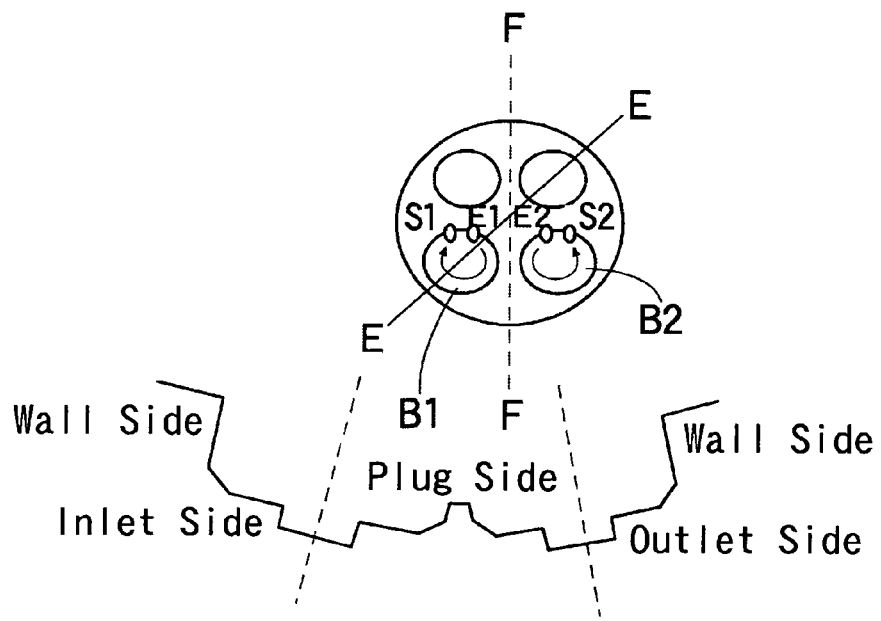
FIG. 14 illustrates a valve-seat arrangement and cross-sectional shape, and is an explanatory diagram for explaining a valve-seat processing sequence. It is possible to perform laser processing while rotating a laser-processing head reversely.

For example, when laser-processing the valve seat B1 of FIG. 14 and subsequently performing laser-processing to the valve seat B2, it is laser-processed from the point S1 of the valve seat B1 clockwise along the arrow, and the processing of the valve seat B1 is completed after it is processed to the point E1 beyond the point S1 in order to compensate for the lowering of built-up amount at the starting point/finishing point. Next, with the same posture as it is, after moving the cylinder head horizontally, laser processing is performed counterclockwise from the starting point S2 of the valve seat B2 to the finishing point E2. By means of this, the rewinding operation of the laser-processing head, which is required for every laser-processing of valve seats, is not needed, and accordingly it is possible to improve the productivity.

Here, the clad processing to valve seat is started at the starting point S1 and is completed at the finishing point E1 because of the following reasons. In general, cylinder heads are such that 1-cylinder/4-valve is a mainstream, and the arrangement of valve seats becomes axisymmetric with respect to the line F-F as shown in the upper diagram of FIG. 14. Moreover, the E-E cross section, which passes the centers of the outlet-side valve seat and inlet-side valve seat, is such that, as shown in the lower diagram of FIG. 14, the raw material of plug side becomes thin and the raw material of wall side is thick. Therefore, when starting laser processing from the wall side, since the raw material of wall side is thick, the laser processing at this part is such that the heat diffusion to the raw material is so large that no desirable clad layer can be formed unless the laser output is made higher than ordinarily. On the other hand, when the plug-side processing is carried out with the same high output as it is, since the plug side is such that the raw material is thin, the heat diffusion to the raw material is less, and accordingly such a drawback might occur that the process part is overheated so that the dilution of aluminum host phase becomes excessive, and the like. Consequently, the quality of formed clad layer does not become stable. However, when laser processing is carried out from the plug side, since the plug side is such that the raw material is thin, it is possible to carry out clad processing with ordinary laser output. And, due to the heat conduction of this clad processing, the raw material of wall side is turned into preheated state. Therefore, when laser processing the wall side, if the laser output is maintained as same as ordinarily, a favorable clad layer can be obtained. In other words, by starting laser processing from the plug side, it is possible to always clad-process with steady output.

In the conventional clad-processing method, it becomes such a constitution that, after supplying a powdery material to a process part with respect to the development direction of processing, laser light is irradiated so that the powdery material is melted. That is, it becomes such a positional relationship that a laser beam is irradiated behind the deposition center of powdery material with respect to the development direction of processing. By means of this, since the powdery material, which is supplied in the development direction with respect to the processing direction, is likely to be taken in into the molten pool of powdery material, which has been melted by the laser beam already, it is possible to obtain a high yield ratio regarding powdery material.

Figure 15:
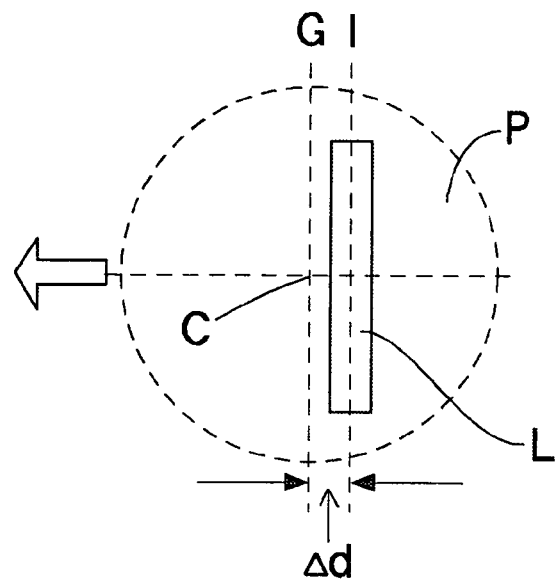
FIG. 15 is an explanatory diagram for illustrating a state that the deposition center of powdery material and the irradiation position of laser beam are offset.

This characteristic can be applied to the laser-clad processing method of the present invention as well. In the laser-processing head of the present invention, it is possible to match the deposition center of powdery material with the laser irradiation position by using the coaxial nozzle. Accordingly, since it is possible to make the processing direction variable back and forth as aforementioned, the taken-in into the molten pool of powdery material is increased by displacing (offsetting) the center of laser beam, which is emitted from the nozzle depending on the processing direction, with respect to the deposition center of powdery material by a predetermined distance as shown in FIG. 15, and consequently it is possible to furthermore improve the yield ratio of powdery material. For example, as shown in FIG. 15, the laser beam L is irradiated so that the center line I of the laser beam is disposed behind the line G, which passes the volumetric center C of the powdery material P, by $\Delta d$ with respect to the processing direction (arrow). Here, $\Delta d$ is the offset magnitude.

Figure 16:
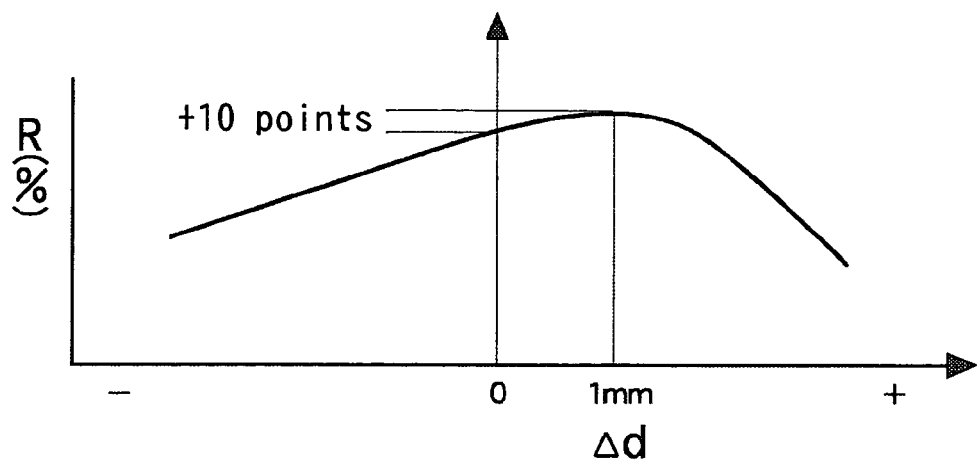
FIG. 16 is a diagram for illustrating an example of the relationship between an offset distance (Δd) and a powdery-material yield ratio. Moreover.

In FIG. 16, an example of the relationship between the offset magnitude ($\Delta d$) and the yield ratio (R) of powdery material is shown schematically. The yield ratio of powdery material is adapted to R=Built-up Weight/Supplied Powder Amount×100 (%). 0 is the instance where the deposition center of powdery material coincides with the irradiation position of laser beam, the instance where the deposition center of powdery material is more forward than the irradiation position of laser beam with respect to the processing direction is adapted to +, and the instance where the deposition center of powdery material is more rearward than the irradiation position of laser beam with respect to the processing direction is adapted to −. In this example, when the deposition center of powdery material is disposed more forward than the irradiation position of laser beam by 1 mm in the processing direction, the yield ratio becomes the highest. By thus offsetting them, it was possible to improve the yield ratio of powdery material by about 10 points, compared with the instance where the irradiation position of laser beam coincides with the volumetric center of powdery material.

Figure 17:
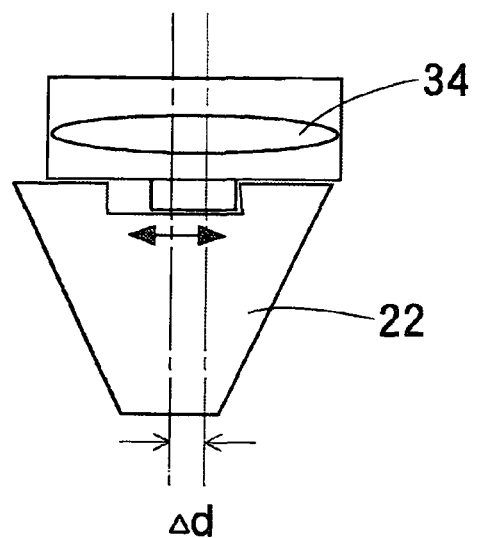
FIG. 17 is a diagram for illustrating an example of a mechanism for offsetting a laser beam.

As described above, in order to offset the irradiation position of laser beam with respect to the deposition center of powdery material, when being equipped with a mechanism for sliding the lens 34 horizontally with respect to the nozzle 22 within the optical system of laser-processing head like FIG. 17, for example, it is possible to offset the nozzle's axial center line (which passes the deposition center of powder material) with respect to the laser beam's irradiation position.

Next, regarding a powdery-material supplying method of the present embodiment mode, it will be described.

The laser-processing time for valve seat is such a short period of time as about 5 seconds per each 1-piece valve seat. Within this short period of time, a constant amount of powdery material should be stably supplied to a process part from a powdery-material supply means by way of the coaxial nozzle. Accordingly, in the present embodiment mode, it is adapted to the powdery-material supply means of aforementioned FIG. 7. In accordance with this powdery-material supply means, it is possible to stably supply a constant amount of powdery material to a process part.

The summary of the actions of the powdery-material supplying means of FIG. 7 will be hereinafter described. Note that this series of actions are carried out by the computer of the control apparatus of the present supply means along a program.

First of all, when a supply starter switch is operated to turn on, a predetermined amount of carrier gas is started to be introduced into the airtight container 411 for a unit period of time, and the internal pressure of the airtight container 411 starts to rise. Thereafter, only when a predetermined amount of the powder material P is not in the metering hopper 421, the replenishing valve 419 is opened to charge the powdery material P into the metering hopper 421 from the replenishing hopper 412 through the guide pipe 418. When the powdery material P in the metering hopper 421 reaches a predetermined amount, the replenishing valve 419 is closed to stop the charging of the powdery material P.

Next, the ultrasonic feeder 413 is turned on to start the supply of the powder material P. By means of this, the powdery material P starts flowing out from the flow-out opening 414 of the airtight container 411 by the pressure of carrier gas, and is supplied compressively to the coaxial nozzle of the laser-processing head through the hose 415 along with the carrier gas; and the laser-clad processing is started to the process part of valve seat.

After a predetermined time has passed, a stopper switch is operated to turn on. By means of this, the flow volume of carrier gas starts declining. After a predetermined time has further passed, the ultrasonic feeder 413 is turned off to stop the supply of the powdery material P. And, after the flow volume of carrier gas has been gradually declined continuously while taking a predetermined time, the mass flow controller 428 is turned off. By means of this, around the time when the feeding-out of the powdery material P from the ultrasonic feeder 413 is stopped, the internal pressure of the airtight container 411 declines gradually, and drops to zero eventually.

Specifically, in the powder supplying apparatus of this embodiment mode, the powder supplying method is carried out, powder supply method in which the powdery material P is flowed out from the flow-out opening 414 by the pressure resulting from the carrier gas, while flowing it to the flow-out opening 414 quantitatively, so that it is supplied compressively to the laser-processing head. And, in this method, when stopping the compressive supply of the powdery material P, the flow of the powdery material P is stopped first, and then the pressure resulting from the carrier gas is declined gradually to a predetermined value (zero herein) while taking a predetermined time since the time immediately before the flow stoppage.

Therefore, during the flow stoppage of the powdery material P, since the pressure resulting from the carrier gas does not decline sharply, the pressure given to the powder material P changes stably to the end, and accordingly the powder material P comes to flow out from the flow-out opening 414 quantitatively. Consequently, the powdery material P comes not to remain at the midway of the hose 415. As a result, the next time when the supply of the powdery material P is resumed, the initial powder supply amount with respect to the coaxial nozzle does not fluctuate unstably. From this, in order to control the powder supply amount at the time of resumption, it is not needed to evacuate the powder remaining in the hose 415, and accordingly no waste comes to occur in the powder. That is, at the resumption of the powder supply to the coaxial nozzle of the laser-processing head, it becomes possible to supply the powder material P stably and wastelessly.

Figure 18:
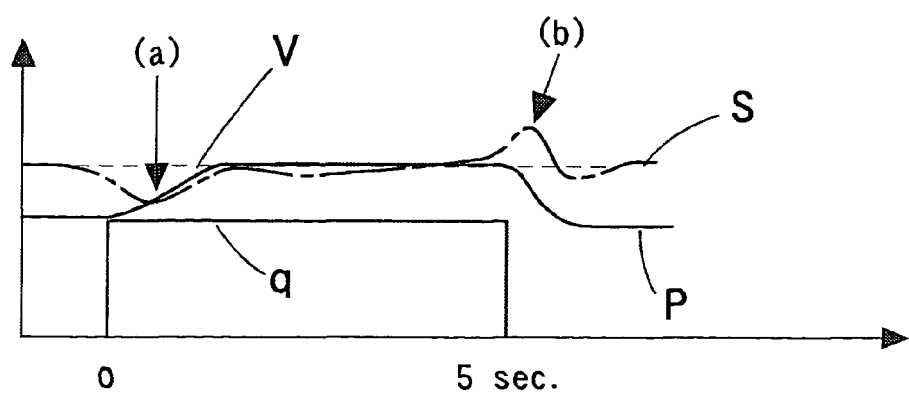
FIG. 18 is a diagram for illustrating the changes of the discharge flow volume s of powdery material and the pressure p within a feeder container (airtight container) when the flow volume v of carrier gas is not controlled. q is the supply amount of powdery material, (a) is a processing start point, and (b) is a processing end point.

The temporal changes of the supply amount (v) of the carrier gas to the airtight container 411, the supply amount (q) of the powdery material supplied from the flow-out opening 414, the pressure (p) within the airtight container, and the discharging flow rate (s) of the powdery material from the coaxial nozzle are illustrated schematically in FIG. 18, temporal changes which are due to the above actions. In this powdery-material supplying method, the discharging flow rate (s) of the powdery material from the coaxial nozzle is low at around the processing start point (a) of valve seat, and meanwhile becomes high at around the processing end point (b). This results from the fact, since the inside of the supply hose becomes a blocked state more or less by the supply of the carrier gas and the supply of the powdery material, the pressure within the airtight container rises gradually, however, when the supply of the powdery material is stopped while keeping supplying the carrier gas, the powdery material is pressed by the pressure within the airtight container, pressure which becomes high at the time when this blocked state is opened, so that the powdery material is discharged.

Specifically, although the supply amount of the powdery material from the feeder during processing is constant, since the amount of the powdery material, which is discharged actually, is less at the start point (a) of clad processing, the thickness of clad layer becomes thin; and since the amount of the powdery material, being discharged, increases at the end point (b) of clad processing, the thickness of clad layer becomes one which is thick. Therefore, it is adapted so that a uniform-thickness built-up layer can be obtained by overlapping this interval.

Here, by controlling the supply amount of the carrier gas to the airtight container 411 with the pressure gauge 417, which is installed to the airtight container 411, so as to make the pressure during the powdery-material supply constant, it is possible to stabilize the discharging flow rate of the powdery material P at the discharge opening of the coaxial nozzle.

Figure 19:
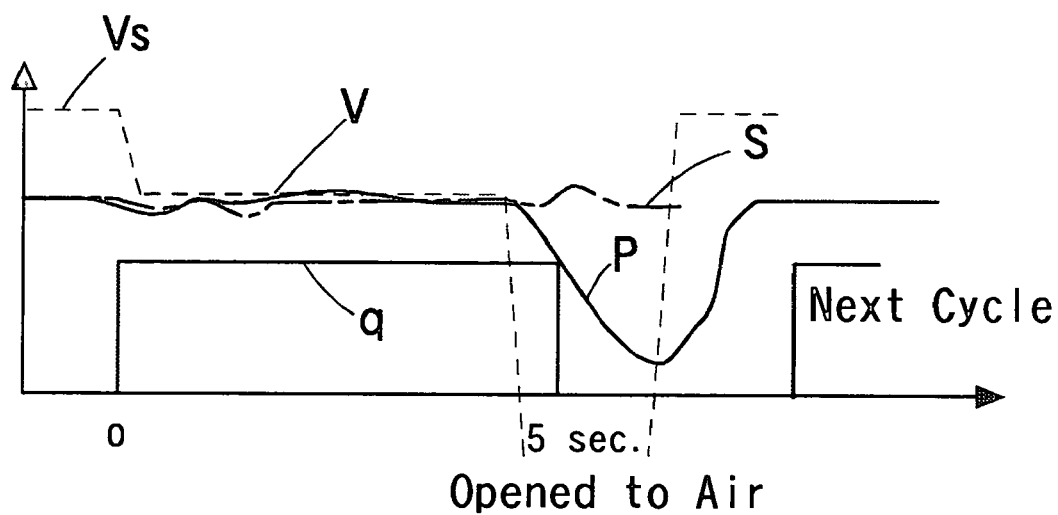
FIG. 19 is a diagram for illustrating the changes of the discharge flow volume s of powdery material and the pressure p within a feeder container (airtight container) when the flow volume v of carrier gas is controlled.

Specifically, as shown in FIG. 19, it is adapted in advance to the same pressure as the container pressure p, which is a pressure at the time when the powdery material and carrier gas are supplied in a steady state to saturate, by increasing the flow volume of the carrier gas to $V_s$ more, compared with the gas supply amount v at the time of steady state, until immediately before starting the supply of the powdery material from the ultrasonic feeder. Thereafter, at around the start of supplying the powdery material from the feeder (0 second), it is reduced to a predetermined steady-state flow volume v to carry out the clad processing. And, immediately (about 0.5 seconds) before stopping the supply of the powdery material from the feeder (5 seconds), a leak valve 433, which is installed adjacent to the airtight container, is opened to make the inside of the airtight container the atmospheric pressure. By means of this, it is possible to keep the flow rate of the powdery material at the nozzle's discharge opening constant, and accordingly it is possible to stabilize the discharging amount of the powdery material during the clad processing. Therefore, it becomes unnecessary to form the overlap like conventionally, and consequently the productivity improves furthermore. Moreover, since the unnecessary overlapped part disappears, the valve seat is such that the clad layer becomes uniform over the entire periphery, and accordingly it is possible to obtain stable quality.

The yield ratio of powdery material can be furthermore improved by selecting appropriate laser-clad processing conditions.

Figure 20:
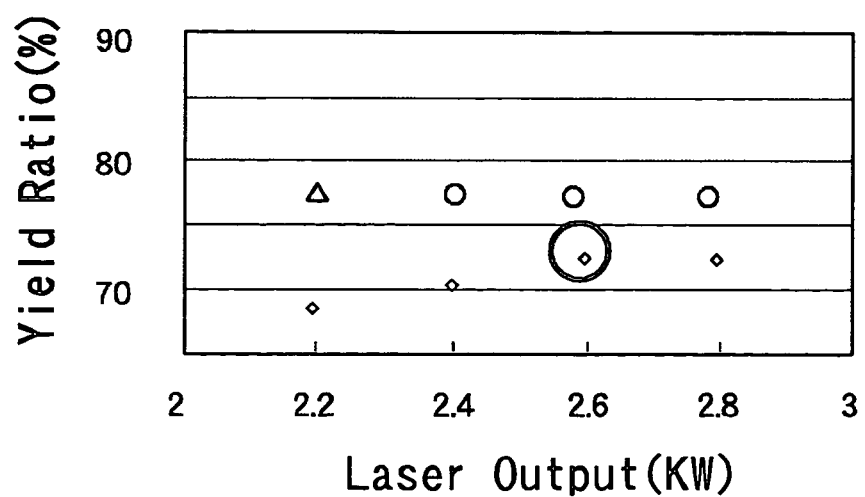
FIG. 20 is a diagram for illustrating an example of the change of powdery-material yield ratio, wherein ♦ specifies the yield ratio, moreover, Δ and ○ specify the appearance judgements of clad layer.

For example, since the higher the laser output is the higher the heat input to powdery material becomes, the yield ratio of powdery material improves to a certain output value. However, since the yield ratio of powdery material saturates at a certain extent, the laser output can desirably be set up at the saturation point. In FIG. 20, an example of the relationship between the laser output and the yield ratio of powdery material is shown. The inside diameter D (described later) is adapted to 19 mm, and the gas flow volume was adapted to 16 L/min. In the diagram, ♦ specifies the relationship between the output of laser beam and the yield ratio, and A and O specify the results of visually judging the appearances of clad layers formed under the respective conditions. Δ is such that, since the melting is insufficient, clad layers having predetermined width and height are not obtained, and ○ is clad layers with appearances which are free of problems. From FIG. 20, it is understood that, although the yield ratio rises until the laser output is. 2.6 kw, the yield ratio of powdery material does not increase even when the output is raised more than that. That is, the laser output in this instance can preferably be adapted to 2.6 kw.

Figure 21:
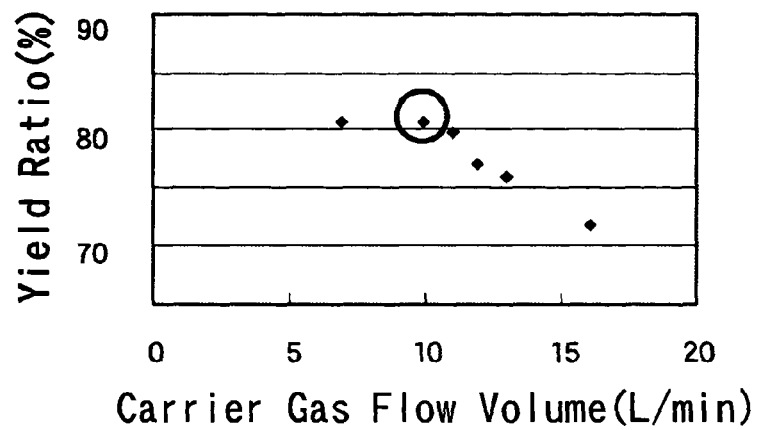
FIG. 21 is a diagram for illustrating an example of the change of powdery-material yield ratio by carrier-gas volume. Moreover.

Moreover, when the carrier gas volume is too much, even if a powdery material is exposed to a laser beam, it has been scattered before it melts, and accordingly the yield ratio of powdery material degrades. Therefore, the carrier gas volume can desirably be adapted to a value immediately before the yield ratio declines. In FIG. 21, there is shown an example of the change of the yield ratio of powdery material by the carrier gas volume when the laser output is constant (2.6 kw). Although the yield ratio of powdery material does not change until the carrier gas volume is 10 L/min., the yield ratio starts degrading sharply when it exceeds this value. Therefore, it is appropriate that the carrier gas volume in this instance can be adapted to 10 L/min.

Figure 22:
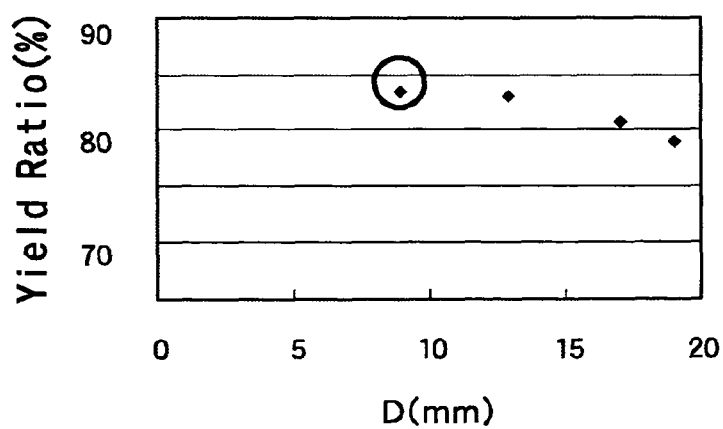
FIG. 22 is a diagram for illustrating an example of the relationship between excess-weld inside diameter (D) and powdery-material yield ratio.
Figure 22:
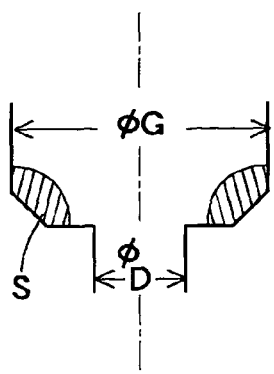

An aluminum surface, which is formed on a valve seat, is machined to a predetermined shape. In this instance, the more the inside-diameter-side excessive thickness is (the smaller the inside diameter D is in the right diagram of FIG. 22), the more likely a powdery material can be deposited without letting it run away, and consequently the yield ratio of powdery material improves. In FIG. 22, an example of the relationship between this inside diameter and the yield ratio of powdery material forming a clad layer S is shown. The yield ratio degrades in accordance with the increment of the inside diameter D, and the inside diameter D in this instance can desirably be adapted to 9 mm.

Next, regarding an example in which the laser-clad processing is performed onto 8 pieces of inlet-side valve seats of the cylinder head H using the laser-clad processing apparatus which has the constitution shown in FIG. 1, it will be described concretely.

The major specifications of the laser-clad processing apparatus were such that the laser: 3 kw semiconductor laser, the wavelength: 940 nm, the coaxial nozzle: Koax series produced by FhG, the laser-processing-head inclination angle: 30 degrees with respect to the verticality, the rotation of the laser-processing head: 420-degree forward rotation and reverse rotation (60-degree overlap), and the laser-processing time: 7 seconds/seat.

Moreover, the major processing conditions for laser-processing the 8-piece valve seats were such that the processing rate: 1 m/min., the laser output: 2.6 kw, the powdery-material supplying rate: 1 g/s, the type of the powder material: CuLS50 (copper-based powder), the carrier gas (nitrogen gas) volume: 10 L/min., and the shape of the valve seats (right diagram, FIG. 22): φG: 30 mm, φD: 9 mm.

Figure 23:
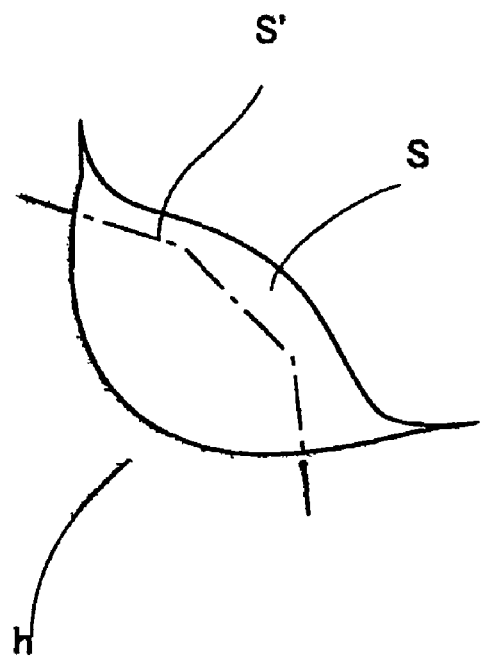
FIG. 23 is a schematic diagram for illustrating the cross-section of clad layer which was formed by laser-clad processing of an example, wherein S is a clad layer, S' is a final shape after machining, and h is an aluminum host material.

The cross-section of a clad layer, which was obtained by the above laser-clad processing, is shown schematically in FIG. 23. A clad layer S is formed on an aluminum host material h of the cylinder head. The dotted line S' is the final shape of the valve seats after machining. Since no unwelded portions, pin-hole defects, and the like, were recognized and the cross-sectional shape was a smooth shape as well, it was understood that there was not any problem.

Note that an engine durability test (180-hour continuous high-speed driving) for confirmation was conducted. On all the evaluation items, such as the worn amount of the valve seats and the valve worn amount, favorable results were obtained, not much different than conventional products.

Note that the present invention is not limited to the aforementioned embodiment mode, it is possible to alter it within a range not deviating from the gist of the invention to carry it out.

For example, a mechanism for transferring the cylinder head in or transferring the processed cylinder head out can be coped with a simple one. Moreover, it is possible to adapt it to a mechanism which moves the laser-processing head together with the rotary means to laser-process a plurality of cylinder heads sequentially. By adapting it to such a mechanism, the cylinder-head holding means can possess the inclination means alone.

Figure 26:
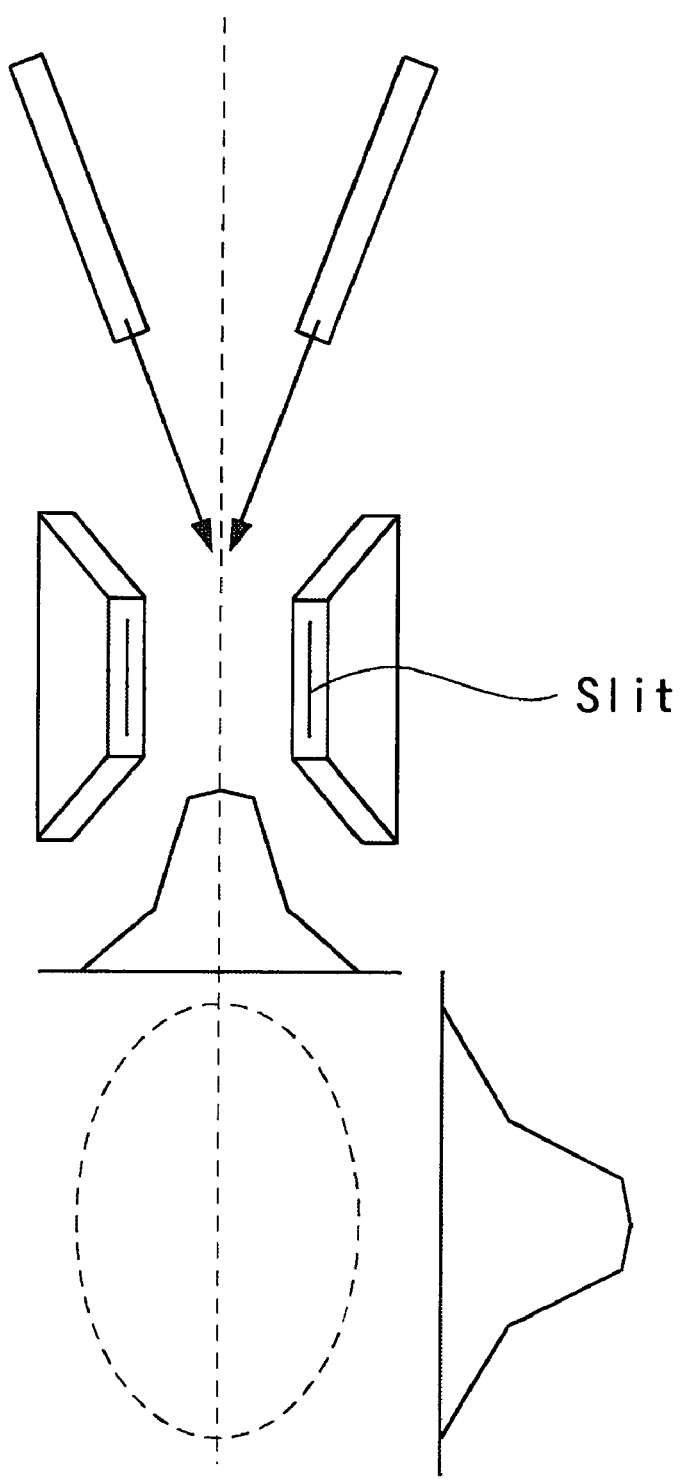
FIG. 26 is a schematic diagram for illustrating an example of a powdery-material supplying nozzle other than the coaxial nozzle.

Moreover, in the present embodiment mode, the coaxial nozzle coaxial with the laser beam is used for the supply of powdery material, however, if it is possible to supply a powdery material in a concentrated manner within the circle whose diameter is the length D of the beam's side A as aforementioned, it is not necessarily limited to the coaxial nozzle. For instance, it is advisable to dispose the slit-like nozzle, as shown in FIG. 26, in a quantity of two on side faces or top and bottom.

INDUSTRIAL APPLICABILITY

As above, the laser-clad processing apparatus according to the present invention is suitable for clad-processing the valve-seat portions of cylinder heads.

The invention claimed is:

1. A laser-clad processing apparatus for laser-clad processing a valve-seat portion of a cylinder head, comprising:
   a cylinder-head holding device holding the cylinder head in an inclined orientation so that a central axial line of the valve seat portion defines a generally vertical line;
   a laser-processing head irradiating a laser beam onto a process part of the valve seat portion, while discharging a powdery material to the process part; and
   a rotator rotating the laser-processing head around the central axial line of the valve seat portion such that said laser-processing head is inclined with respect to the generally vertical line,
   wherein the laser-processing head includes a coaxial nozzle comprising a supply of powdery material, four powdery material-introductory portions spaced from each other at 90° intervals in a circumferential direction, a swirling chamber, and a rectifier rectifying a flow path of the powdery material, configured to direct the powdery material in a direction substantially parallel to the central axial line in an equal amount across the process part of the valve seat portion.

2. The laser-clad processing apparatus set forth in claim 1, wherein said cylinder-head holding device comprises:
   an inclination device inclining the cylinder head between two positions, a first position wherein a central axial line of an inlet valve seat is substantially parallel to a vertical line and a second position wherein a central axial line of an outlet valve seat is substantially parallel to the vertical line; and
   a horizontal-movement device moving the cylinder head in the X-axis direction and in the Y-axis direction, which crosses with the X-axis direction perpendicularly, on a horizontal plane.

3. The laser-clad processing apparatus set forth in claim 1, wherein the laser-processing head comprises:
   a laser-beam generator generating a laser beam; and
   wherein the laser beam passes through the coaxial nozzle.

4. The laser-clad processing apparatus set forth in claim 3, wherein said laser-beam generator comprises a plurality of laser diode arrays, and shapes said laser beam by controlling the laser diode arrays depending on a width direction of said valve-seat portion.

5. The laser-clad processing apparatus set forth in claim 1, wherein said powdery-material supply includes pressurized carrier-gas to compressively supply the powdery material to said laser-processing head.

6. A laser-clad processing method for laser-clad processing a valve-seat portion of a cylinder head, comprising:
   holding the cylinder head in an inclined orientation so that a central axial line of the valve seat portion defines a generally vertical line;
   supplying a powdery material into a swirling chamber, via four powdery material-introductory portions spaced from each other at 90° intervals in a circumferential direction, and rectifying a swirling flow of the powdery material to flow in a direction substantially parallel to the central axial line to be provided in an equal amount across the valve-seat portion while holding a laser-processing head in an inclined orientation with respect to the vertical direction and rotating the laser-processing head around the central axial line of the valve seat portion; and irradiating a laser beam to carry out the laser-clad processing.

7. The laser-clad processing method set forth in claim 6, wherein the laser beam has a rectangular shape.

8. The laser-clad processing method set forth in claim 6, wherein said laser-processing head rotates in a first direction, and rotates in a reverse second direction along the valve-seat portion.

9. The laser-clad processing method set forth in claim 6, wherein the rectified flow of the powdery material results in a concentrated deposit on the valve seat portion within a circle whose diameter is adapted to a side of the laser beam, a side crossing perpendicular to the processing development direction.

10. The laser-clad processing method set forth in claim 6, wherein the powdery material is melted by irradiating the laser beam behind a deposition center of the powdery material by a predetermined distance with respect to the development direction of laser processing.

11. The laser-clad processing method set forth in claim 6, wherein, when stopping the supply of the powdery material, the flow of said powdery material is stopped, and a carrier gas pressure is lowered toward a predetermined value while taking a predetermined time since the time at the flow stoppage or immediately before the flow stoppage.

12. The laser-clad processing method set forth in claim 6, wherein: before supplying the powdery material, a carrier gas flow volume is increased; immediately before starting the flow of the powdery material, the flow volume is decreased to a steady flow volume; and immediately before a flow stoppage, the carrier gas is opened to air.

* * * * *